United States Patent
Koseki et al.

(10) Patent No.: US 11,977,764 B2
(45) Date of Patent: May 7, 2024

(54) PREDICTIVE OPTIMIZATION SYSTEM AND METHOD FOR DATA GENERATION AND TRANSMISSION IN STORAGE NETWORKS

(71) Applicant: Hitachi, Ltd., Tokyo (JP)

(72) Inventors: Hideyuki Koseki, Tokyo (JP); Akira Deguchi, Tokyo (JP); Masahiro Arai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/945,730

(22) Filed: Sep. 15, 2022

(65) Prior Publication Data

US 2023/0297265 A1 Sep. 21, 2023

(30) Foreign Application Priority Data

Mar. 16, 2022 (JP) .................. 2022-041063

(51) Int. Cl.
*G06F 3/06* (2006.01)

(52) U.S. Cl.
CPC ............ *G06F 3/065* (2013.01); *G06F 3/0611* (2013.01); *G06F 3/0635* (2013.01); *G06F 3/0683* (2013.01); *G06F 3/0604* (2013.01)

(58) Field of Classification Search
CPC .... G06F 3/0604; G06F 3/0611; G06F 3/0635; G06F 3/065; G06F 3/0683
See application file for complete search history.

(56) References Cited

U.S. PATENT DOCUMENTS

| 7,152,079 B2 | 12/2006 | Hirakawa et al. |
| 2011/0320865 A1* | 12/2011 | Jain .................. G06F 3/0685 |
| | | 714/E11.088 |
| 2021/0157677 A1* | 5/2021 | Vokaliga ............. G06F 11/1451 |

* cited by examiner

*Primary Examiner* — Larry T Mackall
(74) *Attorney, Agent, or Firm* — Volpe Koenig

(57) ABSTRACT

An administrative terminal receives designation of generation target data and of a generation destination storage device and identifies data similar to the target data. The terminal calculates a first predicted time expected for transmitting the target data from a storage device holding the target data to the generation destination storage device, and a second predicted time expected to be required for a second transmission process of transmitting the similar data from an object storage service to the generation destination storage device and of transmitting difference data between the target data and the similar data from the storage device holding the target data to the generation destination storage device. If the second predicted time is shorter than the first predicted time, the administrative terminal performs the second transmission process to transmit the similar data and the difference data to the generation destination storage device to generate the generation target data therein.

9 Claims, 22 Drawing Sheets

CATALOG INFORMATION 411(264)

| Backup ID(SS#) 411a | Backup SOURCE DEVICE ID 411b | Backup SOURCE VOL # 411c | Backup SOURCE VOL Size 411d | PRECEDING-GENERATION Backup ID 411e | ACQUISITION DATE AND TIME 411f | OBJECT KEY 411g | OBJECT SIZE 411h |
|---|---|---|---|---|---|---|---|
| SS#0 | xxxx | VOL #1 | 1TB | N/A | | Obj #0 | 4MB |
| | | | | | | Obj #1 | 4MB |
| | | | | | | Obj #2 | 4MB |
| | | | | | | ... | ... |
| SS#1 | | | | SS#0 | | Obj #n | 4MB |
| SS#2 | | | | SS#1 | | Obj #n+1 | 4MB |
| ... | | | | ... | | Obj #n+2 | 4MB |
| | | | | | | ... | ... |

FIG. 9

ADMINISTERED STORAGE REGISTRATION TBL  3121

| DEVICE NAME | DEVICE TYPE | CTL IP ADDRESS /Bucket NAME |
|---|---|---|
| AFA #1 | BLOCK SRORAGE | xx . xx . xx . xx |
| SDS #1 | SDS | xx . xx . xx . Xx |
| OBJ Backet #1 | OBJECT STORE | ABADIKDKEK1 |

TRANSFER PATH INFORMATION TBL 3122

| PATH # | Source DEVICE NAME | Destination DEVICE NAME | AVERAGE TRANSFER RATE |
|---|---|---|---|
| | 3122a | 3122b | 3122c | 3122d |
| 1 | AFA #1 | SDS #1 | 10 MB/s |
| 2 | AFA #1 | OBJ Backet #1 | 10 MB/s |
| 3 | SDS #1 | OBJ Backet #1 | 100 MB/s |

FIG. 11

VOL INFORMATION TBL                              3123

| DEVICE NAME | VOL# | Size |
|---|---|---|
| AFA #1 | VOL #1 | 100GB |
| AFA #1 | VOL #2 | 200GB |
| SDS#1 | VOL#1 | 50GB |
| ... | ... | ... |

Backup INFORMATION TBL 3124

| Backup ID | SOURCE DEVICE | SOURCE VOL | ACQUISITION DATE AND TIME |
|---|---|---|---|
| SS #0 | AFA #1 | VOL#1 | '21/1/1 9:00 |
| SS #1 | AFA #1 | VOL#1 | '21/1/1 12:00 |
| ... | ... | ... | ... |

OPTIMAL copy PATH DETERMINATION TBL ~3125

| NORMAL COPY | | | | SIMILAR DATA UTILIZATION COPY | | | | | | |
|---|---|---|---|---|---|---|---|---|---|---|
| NORMAL COPY TARGET SIZE | NORMAL COPY PATH VELOCITY (PATH 3) | | NORMAL COPY PREDICTED TIME | SIMILAR DATA SIZE | SIMILAR DATA TRANSFER PATH VELOCITY | DIFFE- RENCE DATA SIZE | DIFFERENCE DATA FIRST TRANSFER PATH VEOLOCITY (PATH 1) | DIFFERENCE DATA SECOND TRANSFER PATH VEOLOCITY (PATH 2) | | SIMILAR DATA UTILIZATION COPY PREDICTED TIME |
| 3125a | 3125b | 3125c | 3125d | 3125e | 3125f | 3125g | 3125h | 3125i | 3125j | 3125k |
| | | | | | | | | | | |
| | | | | | | | | | | |

FIG. 14

PREDICTIVE OPTIMIZATION SYSTEM AND METHOD FOR DATA GENERATION AND TRANSMISSION IN STORAGE NETWORKS

BACKGROUND OF THE INVENTION

1. Field of the Invention

The present invention relates to a technology for generating data in a device by use of data existing in other devices connected thereto via a network.

2. Description of the Related Art

For use in storing diverse kinds of data, hybrid clouds have become popular as storage that combines on-premises storage with public could storage.

As the use of hybrid clouds is gaining ground, more and more situations are expected where data is copied not only between on-premises devices but also between an on-premises device and a public cloud device as well as between public cloud devices.

As related art, for example, U.S. Pat. No. 7,152,079 discloses a technology in which a journal regarding an update, of data in a first storage system is acquired by a second storage system via communication lines and the second storage system updates the data corresponding to the data in the first storage system by use of the acquired journal.

SUMMARY OF INVENTION

In a case where multiple storage systems are separated from each other, for example, the storage systems are interconnected via a wide area network (WAN). Generally, the bandwidth of the WAN is narrower than that of a network within each storage system, primarily for cost reasons.

As a result, copying large amounts of data between the storage systems can take a long time under bandwidth constraints of the WAN.

The present invention has been made in view of the above circumstances and provides, as an object, a technology for shortening the time required to generate data.

In achieving the foregoing and other objects of the present invention, according to one aspect thereof, there is provided a data generation control system including multiple store a devices and an administrative device. The administrative device receives designation of generation target data and of a generation destination storage device constituting a storage device in which the generation target data is generated. The administrative device identifies data similar to the generation target data. The administrative device calculates a first predicted time expected to be required for a first transmission process of transmitting basic data from a generation source storage device holding the basic data corresponding to the generation target data to the generation destination storage device, and a second predicted time expected to be required for a second transmission process of transmitting the similar data from a similar data storage device holding the similar data to the generation destination storage device an of transmitting difference data between the basic data and the similar data from the generation source, storage, device to the generation destination storage device if the second predicted time is shorter than the first predicted time, the administrative device performs the second transmission process to transmit the similar data and the difference data to the generation destination storage device so as to generate the generation target data therein. If the second predicted time is not shorter than the first predicted time, the administrative device performs the first transmission process to transmit the basic data to the generation destination storage device so as to generate the generation target data therein.

According to the present invention, the time required to generate data can be shortened.

BRIEF DESCRIPTION OF THE DRAWINGS

FIG. 9 is a configuration diagram of catalog information according to the first embodiment;

FIG. 10 is a configuration diagram of an administered storage registration table according to the first embodiment;

FIG. 11 is a configuration diagram of a transfer path information table according to the first embodiment;

FIG. 12 is a configuration diagram of a volume information table according to the first embodiment;

FIG. 13 is a configuration diagram of a backup information table according to the first embodiment;

FIG. 14 is a configuration diagram of an optimal copy path determination table according to the first embodiment;

DESCRIPTION OF THE PREFERRED EMBODIMENTS

Some preferred embodiments of the present invention are described below with reference to the accompanying drawings. It is to be noted that the embodiments to be explained below are not limitative of the present invention as claimed by the appended claims and that not all constituents or their combinations explained in conjunction with the embodiments are indispensable as the means for solving the above-mentioned problems.

In the description that follows, information may be explained using an expression "AAA table." However, information may be expressed using any other data structure. That is, the expression "AAA table" may be rephrased as "AAA information" so as to indicate that the information is not dependent on any specific data structure.

In the explanatory paragraphs that follow, there are cases in which a "program" is assumed to be the subject of operation. Since the program is executed by processor (e.g., central processing unit (CPU)) to perform a predetermined process using suitable storage resources (e.g., memory) and/or a communication interface device e.g., network interface card (NIC)), the processor may alternatively be considered the subject of the process. A process explained using a program as the subject of operation may be considered a process performed by a computer having a processor.

Figure 1:
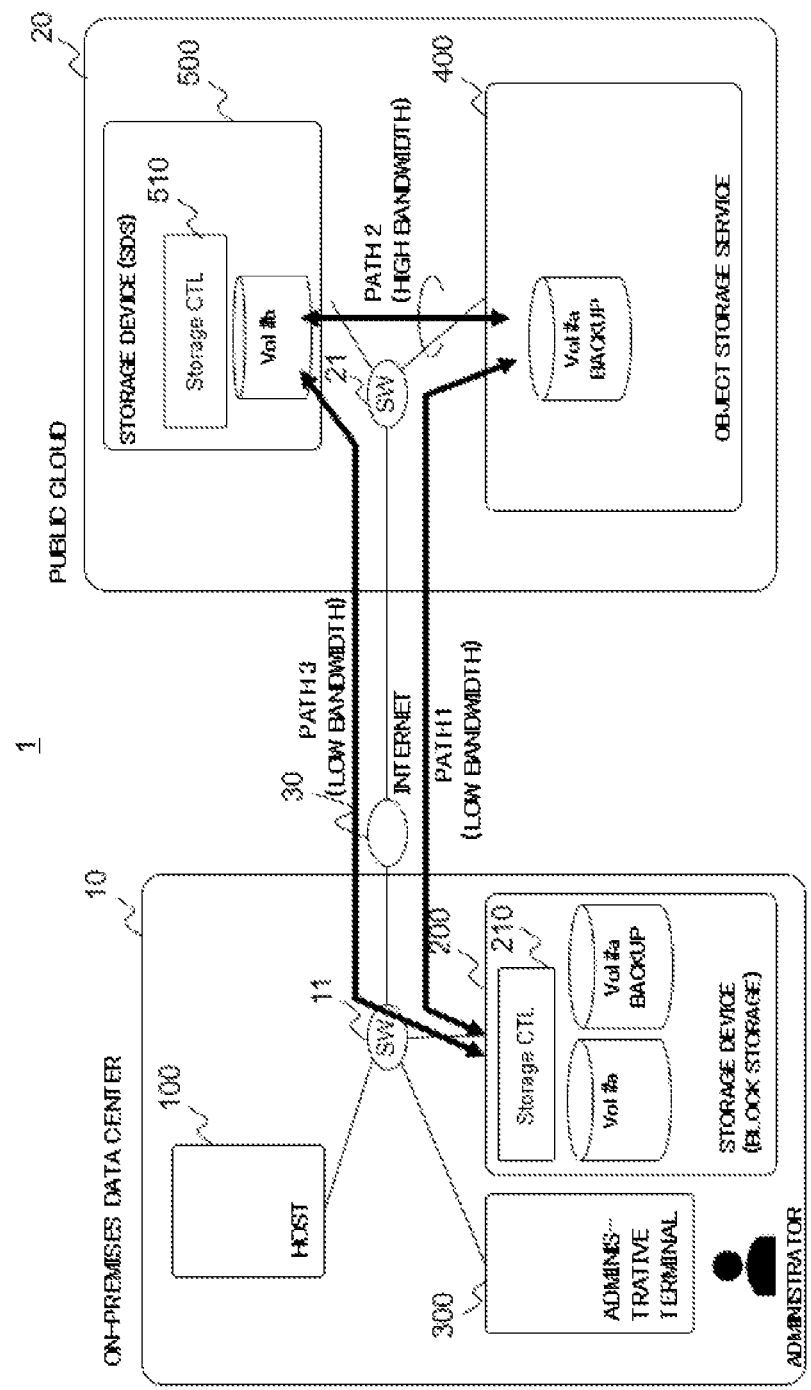
FIG. 1 is an overall configuration diagram of a computer system according to a first embodiment of the present invention.

FIG. 1 is an overall configuration diagram of a computer system according to a first embodiment of the present invention.

A computer system 1 is an exemplary data generation control system having an on-premises data center 10 and a public cloud 20. The on-premises data center 10 and the public cloud 20 are located away from each other. The on-premises data center 10 and the public cloud 20 are interconnected via the Internet 30 acting as an exemplary network.

The on-premises data center 10 includes at least one host 100, at least one storage device 200, and an administrative terminal 300 as an exemplary administrative device. The host 100, the storage device 200, the administrative terminal 300, and the Internet 30 are interconnected via a switch (SW) 11.

The host 100 performs various processes under user control, and carries out input/output (I/O) operations on process-related data to and from the storage device 200. The administrative terminal 300 performs administrative processes on the devices administered by the computer system 1. In the first embodiment, the administrative terminal 300 controls the process of generating (e.g., copying) given data in a predetermined device.

The storage device 200 is block storage that administers data in units of blocks, for example. The storage device 200 includes storage controller (CTL) 210 including a storage operating system (OS) and, using storage regions of physical drives 230 see FIG. 3), stores various types of data. In the first embodiment, the storage device 200 holds volumes for storing data, and stores backup data of the volumes. Also, the storage device 200 stores the backup data of the volumes into an object storage service 400, to be discussed later.

The public cloud 20 includes a storage device 500 and the object storage service 400. The storage device 500, the object storage service 400, and the Internet 30 are interconnected via a switch 21.

The object storage service 400 is an example of storage or a storage device that stores data in units of objects. In the first embodiment, the object storage service 400 stores the backup data of the volumes therein as the objects.

The storage device 500 is software-defined storage (SDS), for example. The storage device 500 includes a storage CTL 510 including a storage OS and, using storage regions of a physical drive 531 (see FIG. 4), stores various types of data.

In the first embodiment, a path (referred to as a path 1) exists between the storage device 200 of the on-premises data center 10 and the object storage service 400 of the public cloud 20; another path (referred to as a path 2) exists between the object storage service 400 and the storage device 500; and another path (referred to as a path 3) exists between the storage device 200 of the on-premises data center 10 and the storage device 500 of the public cloud 20. The path 2, which includes only the network inside the public clod 20, provides a bandwidth higher than that of the path 1 or path 3 that includes the Internet.

Figure 2:
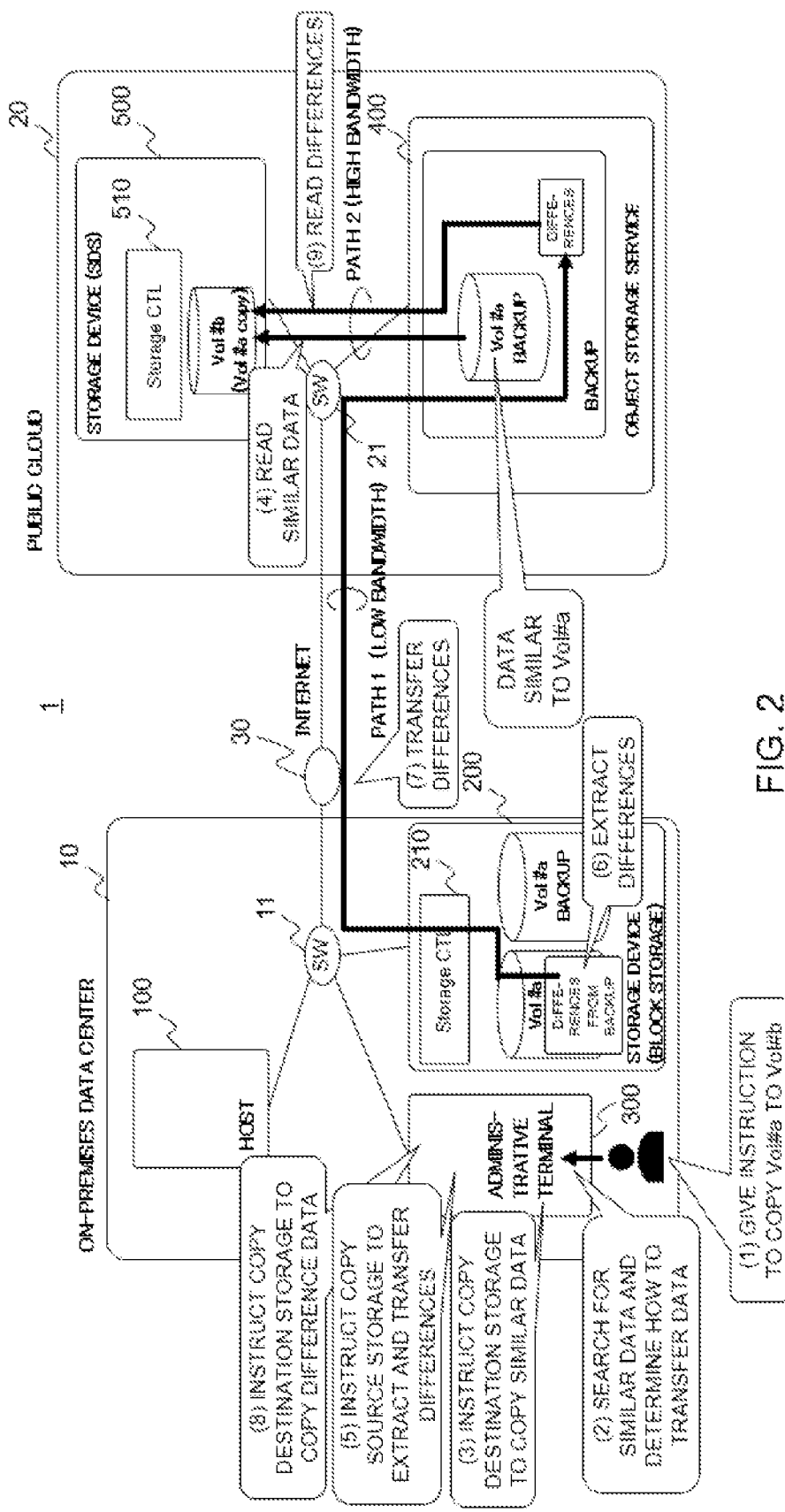
FIG. 2 is a schematic explanatory diagram outlining a data copy process performed by the commuter system according to the first embodiment.

FIG. 2 is a schematic explanatory diagram outlining a data copy process performed by the computer system 1 according to the first embodiment. The data copy process in FIG. 2 is one in which the data (generation target data) of a volume (Vol) #a in the storage device 200 of the on-premises data center 10 is copied to a volume (Vol) #b in the storage device 500 of the public cloud 20. For the first embodiment, it is assumed that the backup data of the Vol #a at a given point in time in the past is stored both in the storage device 200 of the on-premises data center 10 and in the object storage service 400 of the public cloud 20.

The administrative terminal 300 receives, from an administrator, an instruction to copy the data (copy target data (generation target data), basic data of the Vol #a in the storage device 200 copy source storage, copy source storage device, generation storage device, first storage device, backup execution storage device) to the Vol #b in the storage device 500 copy destination storage, copy destination storage device, generation destination storage device, second storage device). Upon receipt of the instruction ((1) in FIG. 2), the administrative terminal 300 searches for data similar to the copy target data (i.e., similar data is searched for), and determines how to transfer the data ((2) in FIG. 2). It is assumed here that the similar data exists in the object storage service 400 (similar data storage device, backup storage device, third storage device) and that it is determined that data copy (generation) is to be performed by transmitting the similar data from the object storage service 400 to the storage device 500. Subsequent processes are explained hereunder on the basis of this assumption.

The administrative terminal 300 instructs the copy destination storage (storage device 500 in the example of FIG. 2) to copy the searched-for similar data ((3) in FIG. 2). According to the instruction, the storage device. 500 retrieves (reads) the designated similar data (backup data of the Vol #a) from the object storage service 400 and stores the retrieved data into the Vol #b ((4) in FIG. 2).

The administrative terminal 300 then instructs the copy source storage (storage device 200 in the example of FIG. 2) to extract differences between the copy target data and the similar data and to transfer the differences to the object storage service 400 ((5) in FIG. 2). According to the instruction, the storage device 200 extracts difference data by comparing the Vol #a with its backup data ((6) in FIG. 2), and transfers the difference data to the object storage service 400 ((7) in FIG. 2).

The administrative terminal 300 then instructs the ropy destination storage to copy the difference data ((8) in FIG. 2). According to the instruction, the storage device 500 reads the difference data from the object storage service 400 and causes the difference data to be reflected in the backup data of the Vol #a stored in the Vol #b, thereby generating a data copy of the Vol #a in the Vol #b. This completes copying of the data of the Vol #a to the Vol #b in the storage device 500.

What follows is a detailed explanation of the configuration of the on-premises data center 10.

Figure 3:
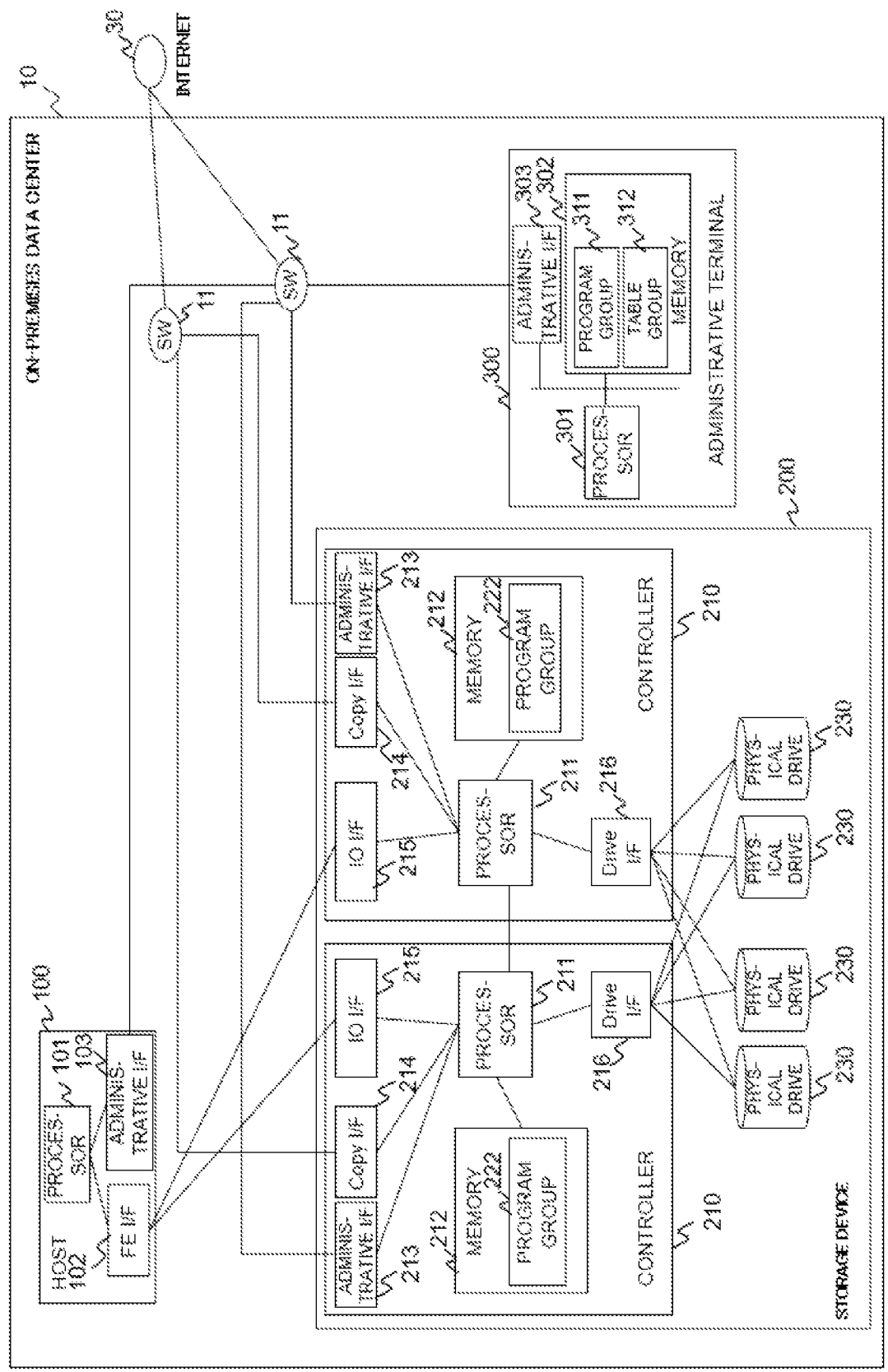
FIG. 3 is a configuration diagram of an on-premises data center according to the first embodiment.

FIG. 3 is a configuration diagram of the on-premises data center 10 according to the first embodiment.

The on-premises data center 10 includes the host 100, the storage device 200, the administrative terminal 300, and at least one switch 11.

The switch 11 performs switching of the data to be transmitted. The host 100 includes a processor 101, a front-end (FE) interface (I/F) 102, and an administrative I/F 103. The processor 101 carries out various processes and performs I/O operations on data to and from the storage device 200. The FE I/F 102 mediates communication with the storage device 200. The administrative I/F 103 mediates administrative communication with the administrative terminal 300.

The storage device 200 has two controllers 210 and multiple physical drives 230. Each of the physical drives 230 is a hard disk drive (HDD) or a solid-state drive (SSD), for example, and stores various types of data such as user data for use by the host 100.

Each controller 210 includes a processor 211, a memory 212, an administrative, I/F 213, a copy I/F 214, an I/O I/F 215, and a drive I/F 216.

The administrative I/F 213 mediates administrative communication with the administrative terminal 300. The copy I/F 214 mediates communication related to the copying of data to and from other storage devices. The I/O I/F 215 mediates communication related to data I/O to and from the host 100. The drive I/F 216 mediates communication with the physical drives 230.

The processors 211 perform various processes according to programs stored in the memories 212.

Each memory 212 is a random-access memory (RAM), for example, and stores a program group 222 to be executed by the processors 211, along with other necessary data.

The administrative terminal 300 includes a processor 301, a memory 302, and an administrative I/F 303. The administrative I/F 303 mediates administrative communication with the host 100 and with the storage device 200.

The processor 301 performs various processes according to programs stored in the memory 302.

The memory 302 is a RAM, for example, which stores a program group 311 to be executed by the processor 301, along with a table group 312 necessary for the processing.

The configuration of the public cloud 20 is explained below in detail.

Figure 4:
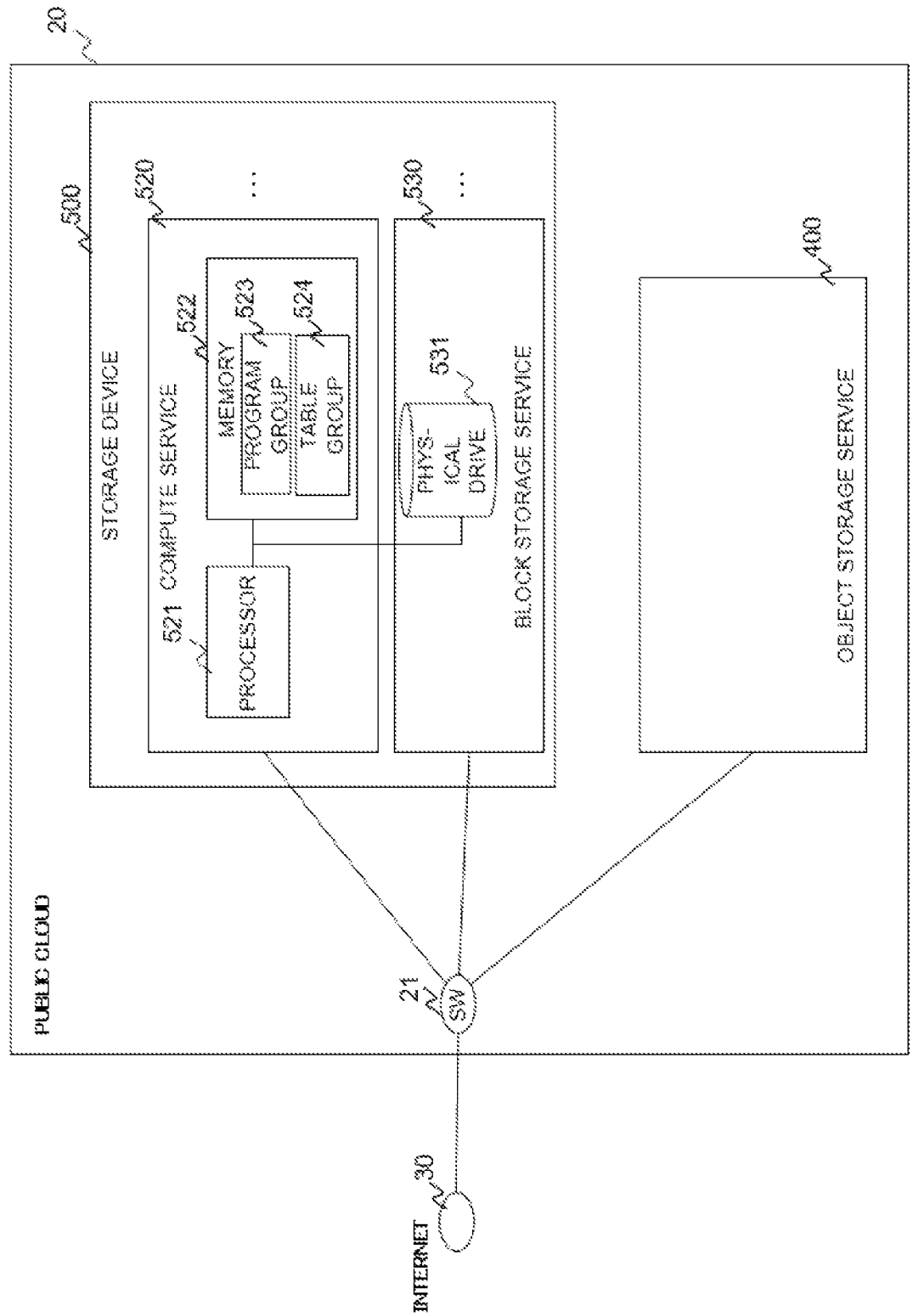
FIG. 4 is a configuration diagram of a public cloud according to the first embodiment.

FIG. 4 is a configuration diagram of the public cloud according to the first embodiment.

The public cloud 20 includes at least one storage device 500, the object storage service 400, and the switch 21.

The switch 21 performs switching of the data to be transmitted. The object storage service 400 has physical drives for storing data, and administers the data in units of objects.

The storage device 500 includes a compute service 520 that carries out various processes and a block storage service 530 that stores data in units of blocks. The compute service 520 includes a processor 521 and a memory 522. The processor 521 executes diverse processes according to programs stored in the memory 522.

The memory 522 is a RAM, for example, which stores a program group 523 to be executed by the processor 521, as well as a table group 524 necessary for the processing.

The block storage service 530 has at least one physical drive 531.

Explained below are the configurations of the program groups 222 and 523 stored respectively in the memories 212 and 522 of the storage devices 200 and 500.

Figure 5:
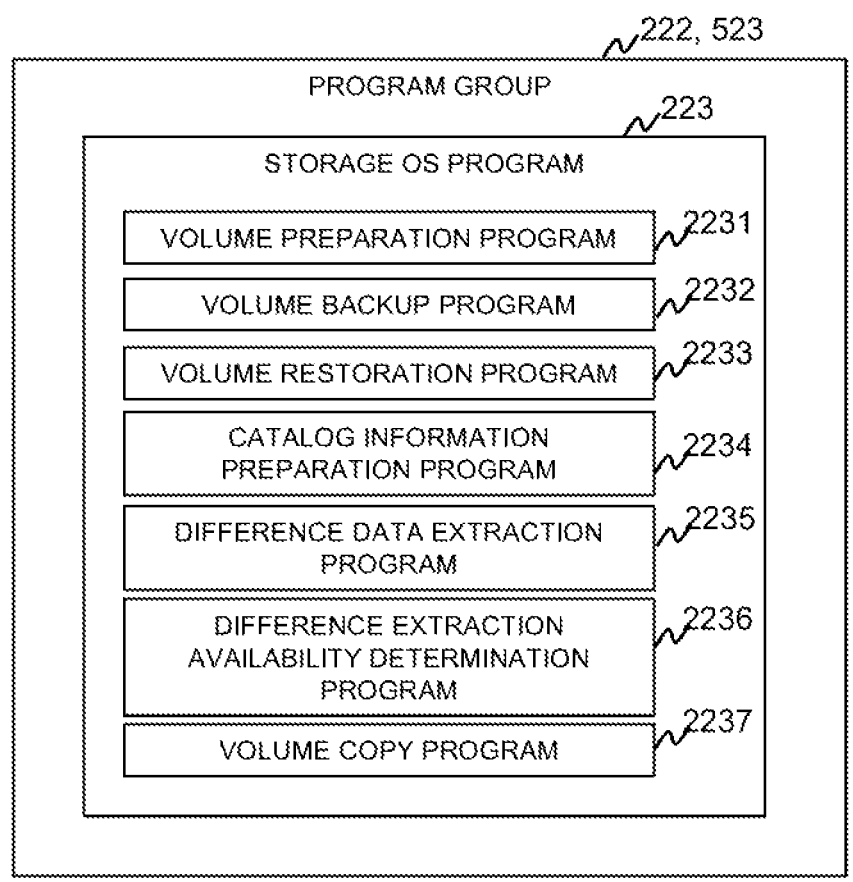
FIG. 5 is a configuration diagram of a program group stored in a memory of a storage device according to the first embodiment.

FIG. 5 is a configuration diagram of the program group stored in the memory of the storage device according to the first embodiment.

The program groups 222 and 523 in the storage devices 200 and 500 each include a storage OS program 223. The storage OS program 223 includes a volume preparation program 2231, a volume backup program 2232, a volume restoration program 2233, a catalog information preparation program 2234, a difference data extraction program 2235, a difference extraction availability determination program 2236, and a volume copy program 2237.

The volume preparation program 2231 performs the process of preparing volumes in the storage device. The volume backup program 2232 performs the process of backing up the volumes in the storage device. The volume restoration program 2233 performs the process of restoring the volumes from the backup data. The catalog information preparation program 2234 performs the process of preparing catalog information 411 (264) (see FIG. 93 regarding volume backup. The difference data extraction program 2235 performs the process of extracting the differences between the data of the volumes and the data similar thereto. The difference extraction availability determination program 2236 performs the process of determining whether or not the differences can be extracted. Whether or not the differences can be extracted may be use for example, on the basis of whether or not the storage device stores the same data as the similar data. The volume copy program 2237 performs the process of copying the volumes.

The configuration of the memory 302 of the administrative terminal 300 is explained below.

Figure 6:
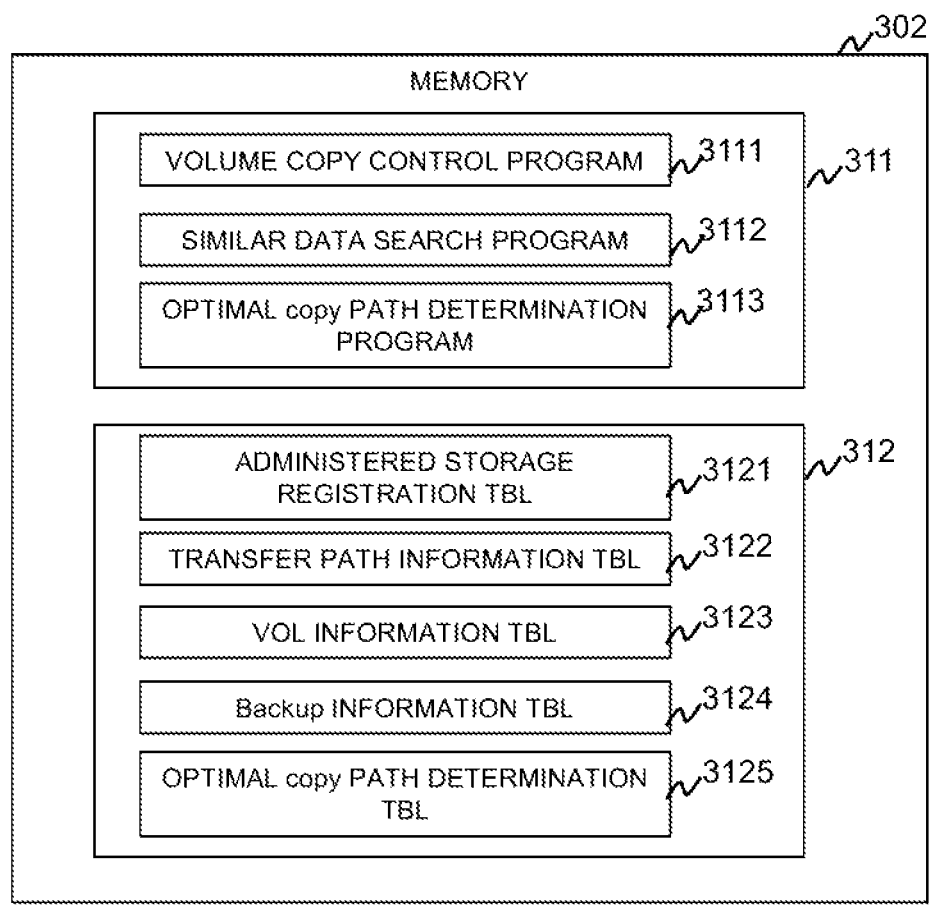
FIG. 6 is a configuration diagram of a memory of an administrative terminal according to the first embodiment.

FIG. 6 is a configuration diagram of the memory of the administrative terminal according to the first embodiment.

The memory 302 of the administrative terminal 300 stores the program group 311 and the table group 312. The program group 311 include a volume copy control program 3111, a similar data search program 3112, and an optimal copy path determination program 3113.

The volume copy control program 3111 controls the process of copying volume data to the storage device. For example, the volume copy control program 3111 performs the process of issuing instructions to copy the volumes. The similar data search program 3112 performs the process of searching for the data similar to the data targeted for copy. The optimal copy path determination program 3113 performs the process of determining an optimal path upon copying generating) the copy target data.

The table group 312 includes an administered storage registration table (TBL) 3121, a transfer path information TEL 3122, a VOL information TEL 3123, a backup information TEL 3124, and an optimal copy path determination TEL 3125. Each of these tables will be discussed later in detail.

A data backup process performed by the storage device 200 is explained below.

Figure 7:
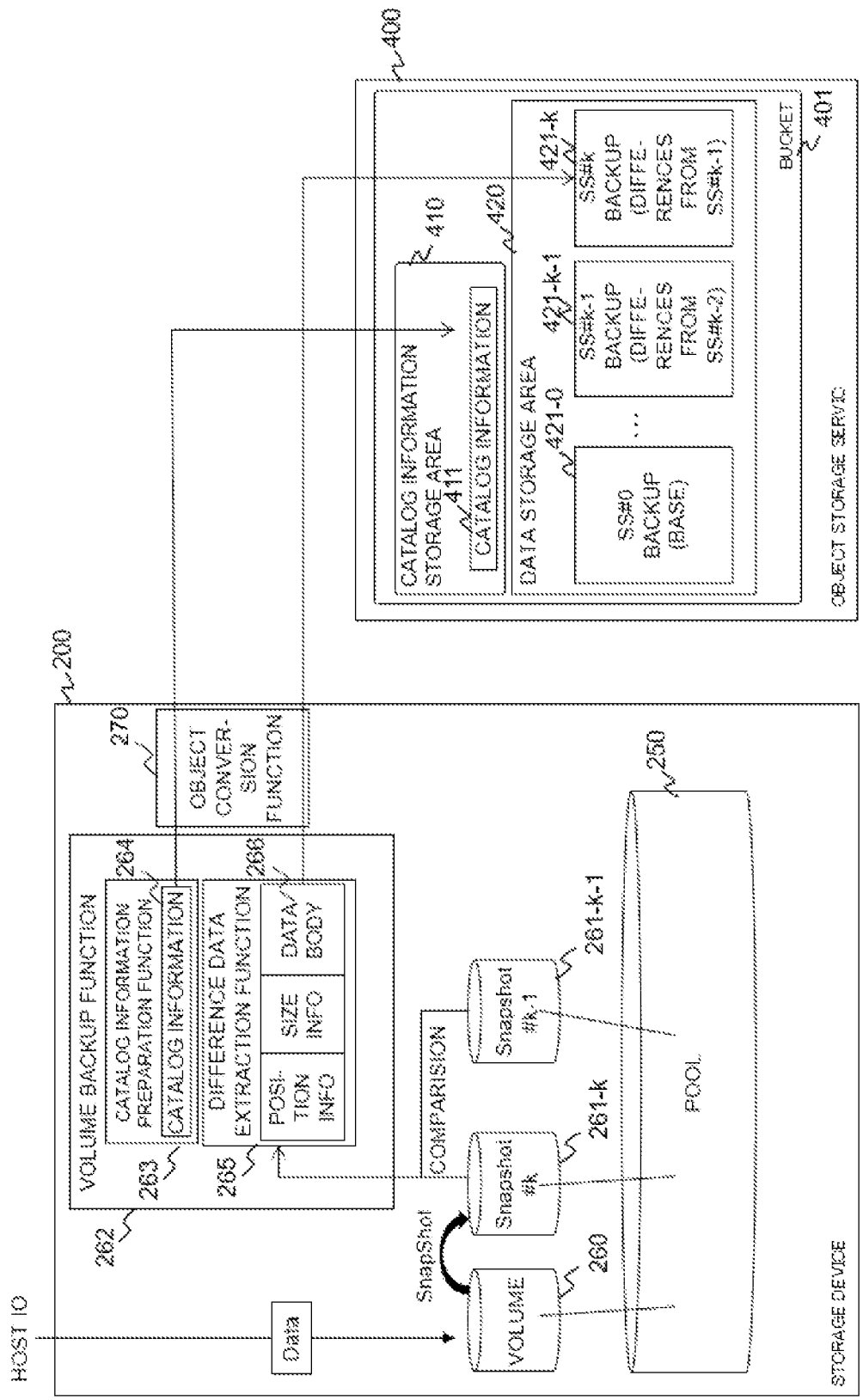
FIG. 7 is an explanatory diagram explaining a date backup process performed by the storage device according to the first embodiment.

FIG. 7 is an explanatory diagram explaining the data backup process performed by the storage device according to the first embodiment.

In the storage device 200, a pool 250 is configured on the basis of the storage regions in the physical drives 230. A volume 260 and a snapshot (SS) volume 261 are assigned the storage regions in the pool 250.

The storage device 200 has a volume, backup function 262 and an object conversion function 270.

The backup function 262 is implemented by the processor 211 executing the Volume backup program 2232. The volume backup function 262 is a function that acquires a snapshot of the volume 260, prepares backup data 266 including the difference data between the current snapshot and the preceding snapshot as well as metadata regarding the difference data, and stores the backup data 266 into external storage (object storage service 400 in the first embodiment).

The volume backup function 262 makes use of a catalog information preparation function 263 and difference data extraction function 265. The catalog information preparation function 263 is implemented by the processor 211 executing the catalog information preparation program 2234. The difference data extraction function 265 is implemented by the processor 211 executing the difference data extraction program 2235.

The volume backup function 262 performs backup in an incremental form on a periodical basis, for example. Specifically, the volume backup function 262 acquires a snapshot of the backup target volume, causes the difference data extraction function 265 to compare the currently acquired snapshot data with the snapshot data of the preceding generation to extract the updates as the difference data, and prepares encapsulated backup data 266 by supplementing the difference data (data body) with position information indicative of the storage locations of the difference data in the volume and with size information indicative of the size of the difference data. For example, being backup data in an incremental form the first backup data includes all data of the backup target volume, and the second and subsequent backup data include the difference data between the newly acquired snapshot and the snapshot of the preceding generation, position information, and size information.

Also, the volume backup function 262 causes the catalog information preparation function 263 to prepare catalog information 254 on the basis of the snapshots of the backup target data and information regarding the backup source volumes. In the first embodiment, the catalog information preparation function 263 acquires catalog information 411 from the object storage service 400, and adds later changes to the acquired catalog information 411 to prepare the catalog information 264.

Also, the volume backup function 262 stores the backup data 266 and the catalog information 264 into the object storage service 400. After the backup data 266 and the catalog information 264 have been stored in the object storage service 400, the snapshot data other than the most recent snapshot may be deleted from the pool 250.

The object conversion function 270 is implemented by the processor 211 executing the volume backup program 2232. The object conversion function 270 is a function that converts block format data into object format data to be handled by the object storage service 400.

The object storage service 400 has a bucket 401 that stores actual data. The bucket 401 is divided internally into a catalog information storage area 40 and a data storage area 420. The catalog information storage area 410 stores the catalog information 411. The data storage area 420 stores the data corresponding to the backup data 266.

A data restoration process performed by the storage device 500 is explained below.

Figure 8:
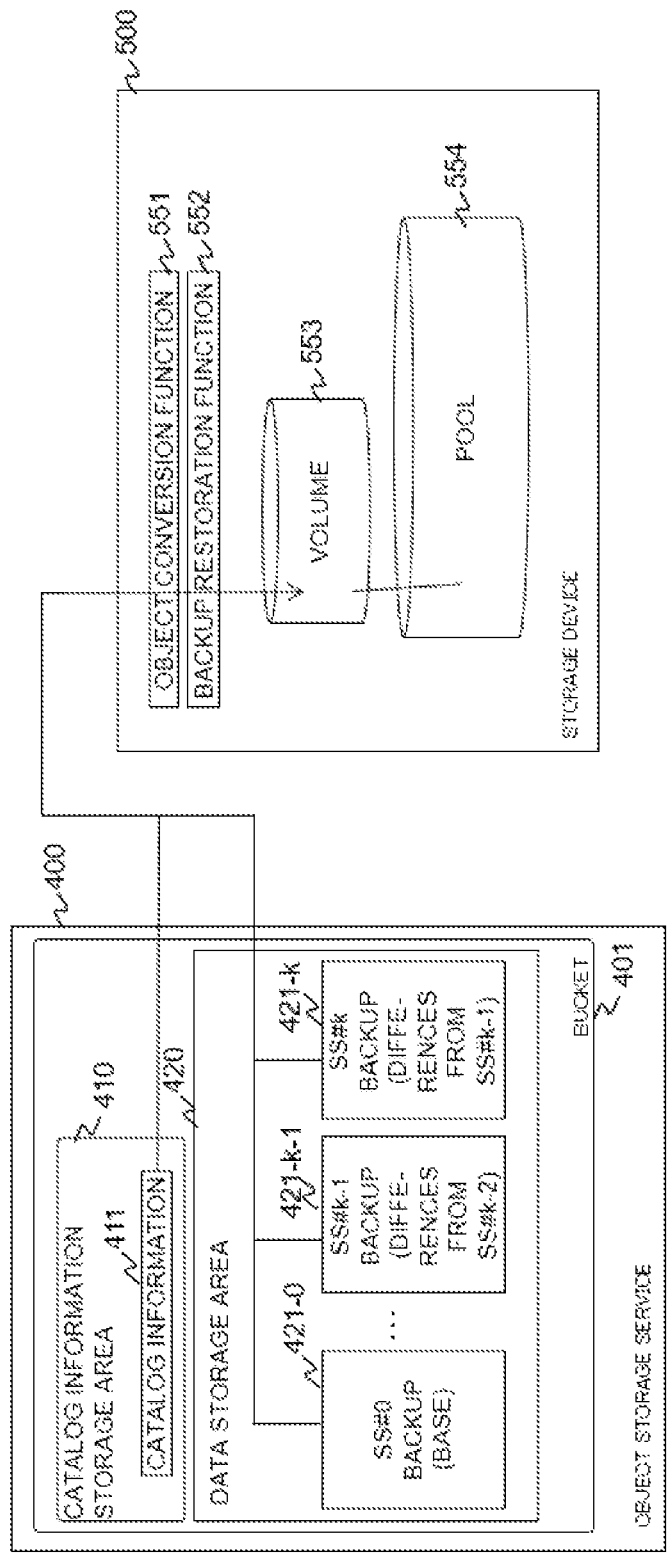
FIG. 8 is an explanatory diagram explaining a backup data restoration process performed by the storage device according to the first embodiment.

FIG. 8 is an explanatory diagram explaining a backup data restoration process performed by the storage device according to the first embodiment.

In the storage device 500, a pool 554 is configured on the basis of the storage regions of the physical drive 531 in the block storage service 530. A volume 553 is assigned the storage regions of the pool 554.

The storage device 500 has an object conversion function 551 and a backup restoration function 552.

The object conversion function 551 is implemented by the processor 521 executing the volume backup program 2232. The object conversion function 551 is a function that converts, into block format data, the object format data handled by the object storage service 400.

The backup restoration function 552 is implemented by the processor 521 executing the volume restoration program 2233. The backup restoration function 552 acquires SS #0 backup data 421-0 as the first backup data from the object storage service 400, restores data based on the 3510 backup data 421-0 in the copy destination volume. The backup restoration function 552 then acquires backup data sequential up to the backup data of the snapshot to be restored (e.g., snapshot corresponding to the copy target volume) and, using each piece of the backup data acquired for the volume, restores the differences. In this manner, the desired data can be restored (generated) in the volume.

The catalog information 411 (264) is explained below.

FIG. 9 is a configuration diagram of the catalog information according to the first embodiment.

The catalog information 411 (26) is used to administer information regarding backups (snapshots). The catalog information 411 (264) stores entries for each of the backups.

The entries in the catalog information 411 (264) include fields of a backup identification (ID) (SS #) 411a, a backup source device ID 411b, a backup source VOL 411c, a backup source VOL size 411d, a preceding-generation backup ID 411e, an acquisition date and time 411f, an object key 411g, and an object size 411h.

The backup ID(SS #) 411a stores the backup ID corresponding to the entry. In the first embodiment, a snapshot number (SS #) is used as the backup ID. The backup source device ID 411b stores the ID of the device (backup source device) that holds the volume corresponding to the entry and targeted for backup. The backup source VOL #4 411c stores the ID (Vol #) of the volume (backup source volume) corresponding to the entry and targeted for backup. The backup source VOL size 411d stores the size of the backup source volume corresponding to the entry. The preceding-generation backup ID 411e stores a backup ID indicative of the backup that precedes, by one generation, the backup corresponding to the entry. In a case where the backup corresponding to the entry is the first backup of the volume, the backup of one generation ago does not exist. In this case, the preceding-generation backup ID 411e holds "not available (N/A))". The acquisition date and time 411f stores the date and time at which the backup corresponding to the entry was acquired. The object key 411g stores the identification information (object key) regarding the object in the object storage service 400 holding the backup data of the volume corresponding to the entry. In a case where multiple objects are used for the backup corresponding to the entry, multiple object keys are associated with the entry. The object size 411h stores the size of the object corresponding to the object key in the object key 411g of the entry.

The administered storage registration TBT 3121 is explained below.

FIG. 10 is a configuration diagram of the administered storage registration TBL according to the first embodiment.

The administered storage registration. TEL 3121 is used to administer the information regarding the storage targeted to be administered by the administrative terminal 300. The administered storage registration TEL 3121 stores entries for each type of administered storage. The entries in the administered storage registration TBL 3121 include fields of a device name 3121a, a device type 3121b, and a CTL IP address/bucket name 3121c.

The device name 3121a stores the device name defined by the user for the storage corresponding to the entry. The device type 3121b stores the device type of the storage corresponding to the entry. The device types include block storage, SDS, and object store, for example. The CTL IF address/bucket name 3121c stores the IF address or bucket name of the CTL of the storage corresponding to the entry.

The transfer path information TEL 3122 is explained below.

FIG. 11 is a configuration diagram of the transfer path information TBL according to the first embodiment.

The transfer path information TBL 3122 is used to administer the information regarding the paths between multiple devices. The transfer path information TEL 3122 stores entries for each of the paths. The entries in the transfer path information TEL 3122 include fields of a path #3122a, a source device name 3122b, a destination device name 3122c, and an average transfer rate 3122d.

The path #3122a stores the number of the path corresponding to the entry. The source device name 3122b stores the device name of the source of the path corresponding to the entry. The destination device name 3122c stores the device name of the destination of the path corresponding to the entry. The average transfer rate 3122d stores an average transfer rate of the path corresponding to the entry.

The VOL information TEL 3123 is explained below.

FIG. 12 is a configuration diagram of the VOL information TEL according to the first embodiment.

The VOL information TEL 3123 is used to administer the information regarding the volumes held in each type of storage. The VOL information TBL 3123 stores entries for each of the volumes. The entries in the VOL information TEL 3123 include fields of a device name 3123a, a VOL #3123b, and a size 3123c.

The device name 3123a stores the device name of the device that holds the volume corresponding to the entry. The VOL #3123b stores the identification information (VOL #) regarding the volume corresponding to the entry in the first embodiment, the VOL # is a unique value inside the device, for example. The size 3123c stores the size of the volume corresponding to the entry.

The backup information TBL 3124 is explained below.

FIG. 13 is a configuration diagram of the backup information TEL according to the first embodiment.

The backup information TBL 3124 is used to administer the backup-related information. The backup information TBL 3124 is prepared on the basis of the catalog information 411 in the object storage service 400. The backup information TBL 3124 stores entries for each backup. The entries in the backup information TBL 3124 include fields of a backup ID 3124a, a source device 3124b, a source VOL 3124c, and an acquisition date and time 3124d.

The backup ID 3124a stores the ID of the backup corresponding to the entry (backup ID). The source, device 3124b stores the ID of the device (backup source device) that holds the volume corresponding to the entry and targeted for backup. The source VOL 3124c stores the ID of the volume (backup source VOL) corresponding to the entry and targeted for backup. The acquisition date and time 3124d stores the date and time at which the backup corresponding to the entry was acquired.

The optimal copy path determination TBL 3125 is explained below.

FIG. 14 is a configuration diagram of the optimal copy path determination TBL according to the first embodiment.

The optimal copy path determination TBL 3125 is used to administer the information for determining an optimal copy path. The optimal copy path determination TBL 3125 includes fields of a normal copy 3125a and a similar data utilization copy 3125e.

The normal copy 3125a stores fields of information regarding normal copy in which the copy target data is copied to the copy destination. The normal copy is a process in which, in the example of FIG. 1, the data of the Vol #a is copied from the storage, device 200 to the storage device 500 via the path 3.

The normal copy 3125a includes fields of a normal copy target size 3125b, a normal copy path velocity 3125c, and a normal copy predicted time 3125d.

The normal copy target size 3125b stores the size of the data targeted for copy. The normal copy path velocity 3125c stores the communication rate of the path for use in normal copy (path 3 in the example of FIG. 1). The normal copy predicted time 3125d stores the time predicted for normal copy (normal copy predicted time).

The similar data utilization copy 3125e stores fields of the information regarding similar data utilization copy in which data is prepared at the copy destination utilizing the data similar to the copy target data. In the example of FIG. 1, the similar data utilization copy involves copying the data similar to the copy target data to the storage device 500 via the path 2, and transferring the differences between the copy target data and the similar data via the paths 1 and 2 in order to generate the copy target data in the storage device 500.

The similar data utilization copy 3125e includes fields of a similar data size 3125f, a similar data transfer path velocity 3125g, a difference data size 3125h, a difference data first transfer path velocity 3125i, a difference data second transfer path velocity 3125j, and a similar data utilization copy predicted time 3125k.

The similar data size 3125f stores the size of similar data. The similar data transfer path velocity 3125g stores the communication rate of the path for use in transferring the similar data (path 2 in the example of FIG. 1). The difference data size 3125h stores the size of difference data constituting the differences between the copy target data and the similar data. The difference data first transfer path velocity 3125i stores the transfer rate of the first path (path 1 in the example of FIG. 1) from among the paths for use in transferring the difference data. The difference data second transfer path velocity 3125j stores the transfer rate of the second path (path 2 in the example of FIG. 1) from among the paths for use in transferring the difference data. The similar data utilization copy predicted time 3125k stores the time predicted to be required for similar data utilization copy.

The processing operations of the computer system 1 are explained below.

A volume copy process is explained first.

Figure 15:
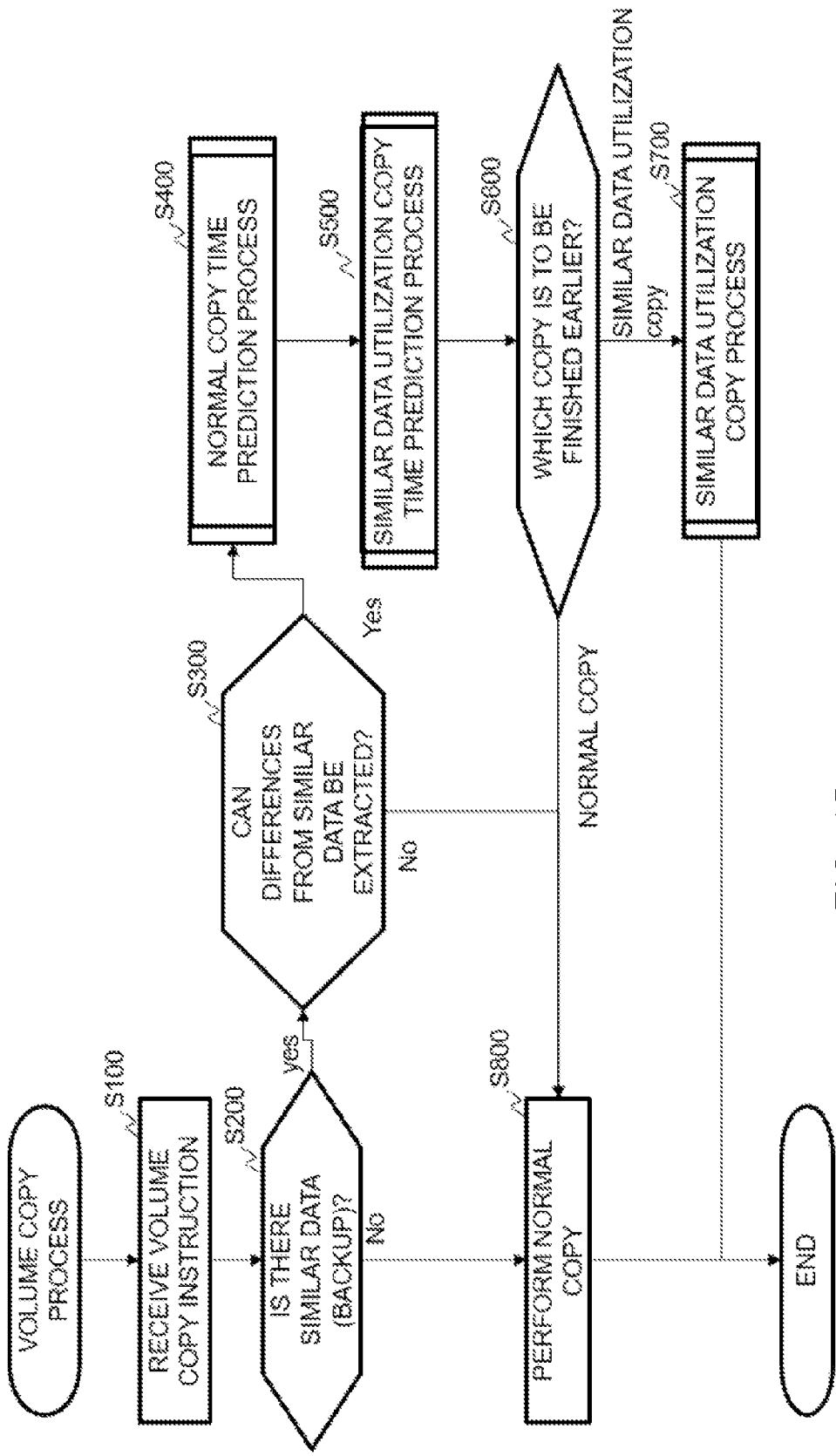
FIG. 15 is a flowchart of a volume copy process according to the first embodiment.

FIG. 15 is a flowchart of the volume copy process according to the first embodiment.

The volume copy control program 3111 of the administrative terminal 300 receives (in step S100), from the administrator, an instruction to copy a volume (volume copy instruction, which is an exemplary generation instruction). The volume copy instruction includes information identifying the volume to be copied (copy target volume), such as the VOL # of the copy target volume and the device name of the copy source storage, and information identifying the copy destination (device name of the copy destination storage). The similar data search program 3112 then determines (in step S200) whether or not the data (similar data) similar to the data of the copy target volume (i.e., copy target data) included in the volume copy instruction exists in some device other than the copy source storage within the computer system 1. In the first embodiment, the similar data search program 3112 references the backup information TBL 3124 to determine whether or not the backup data for the copy target volume exists.

As a result, if it is determined that the similar data does not exist in any device other than the copy source storage ("No" in step S200), the volume copy control program 3111 performs (in step S800) the process of transferring (copying) the data of the copy target volume from the copy source storage to the copy destination storage (in normal copy; a first transmission process), and terminates the process.

On the other hand, if it is determined that the similar data exists in some device other than the copy source storage ("Yes" in step S200), the volume copy control program 3111 then determines whether or not the differences between the similar data and the copy target data can be extracted the copy source storage (in step S300). Specifically, the volume copy control program 3111 queries the copy source storage whether the differences from the copy target data can be extracted, and receives a response from the copy source storage when queried whether the differences between the copy target data and the similar data can be extracted, the copy source storage causes the difference extraction availability determination program 2236 to determine whether or not it is possible to extract the differences between the copy target data and the similar data. The difference extraction availability determination program 2236 sends the result of the determination to the volume copy control program 3111. Here, whether or not the differences between the copy target data and the similar data can be extracted may be determined on the basis of whether or not the copy source storage stores the same data as the similar data.

As a result, if it is determined that the differences between the copy target data and the similar data cannot be extracted ("No" in step S300), the volume copy control program 3111 transfers control to step S800 and causes the normal copy to be executed.

On the other hand, if it is determined that the differences between the copy target data and the similar data can be extracted ("Yes" in step S300), the volume copy control program 3111 performs a normal copy time prediction process (in step S400) for predicting the time required for normal copy (first predicted time). The volume copy control program 3111 then carries out (in step S500) similar data utilization copy time prediction process for predicting the time (second predicted time) required to prepare the copy target data in the copy destination storage, through similar data utilization copy (second transmission process) by transferring the similar data to the copy destination device and also transferring the differences between the similar data and the copy target data to the copy destination device.

The volume copy control program 3111 then determines which of the normal copy and the similar data utilization copy is to be finished earlier than the other copy (in step S600).

As a result, if it is determined that the similar data utilization copy is to be finished earlier, e.g., that the similar data utilization copy predicted time is shorter than the normal copy predicted time ("Similar Data Utilization Copy" in step S600), then the volume copy control program 3111 performs a similar data utilization copy process (step S700) in which similar data utilization copy is executed, and terminates the volume copy process.

On the other hand, if it is determined that the normal copy is to be finished earlier, e.g., that the similar data utilization copy predicted time is not shorter than the normal copy predicted time ("Normal Copy" in step S600), the volume copy control program 3111 transfers control to step S800 and executes normal copy.

The normal copy time prediction process (3400) is explained below.

Figure 16:
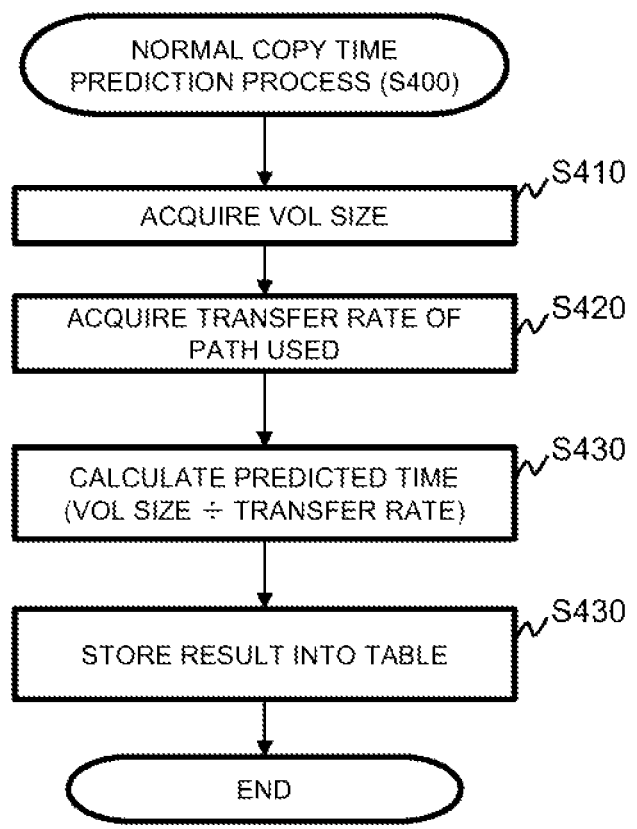
FIG. 16 is a flowchart of a normal copy time prediction process according to the first embodiment.

FIG. 16 is a flowchart of the normal copy time prediction process according to the first embodiment.

The optimal copy path determination program 3113 references the VOL information TBL 3123 to acquire the size of the copy target volume (in step S410). The optimal copy path determination program 3113 then references the transfer path information TEL 3122 to acquire the transfer rate of the path (path 3 an this example) from the copy source storage to the copy destination storage (in step S420).

The optimal copy path determination program 3113 then calculates a predicted time by dividing the size of the copy target volume by the transfer rate (in step S430). The optimal copy path determination program 3113 stores the result of the calculation into the field of the normal copy predicted time 3125d in the optimal copy path determination TBL 3125 (in step S440), and terminates the process.

The similar data utilization copy time prediction process (S500) is explained below.

Figure 17:
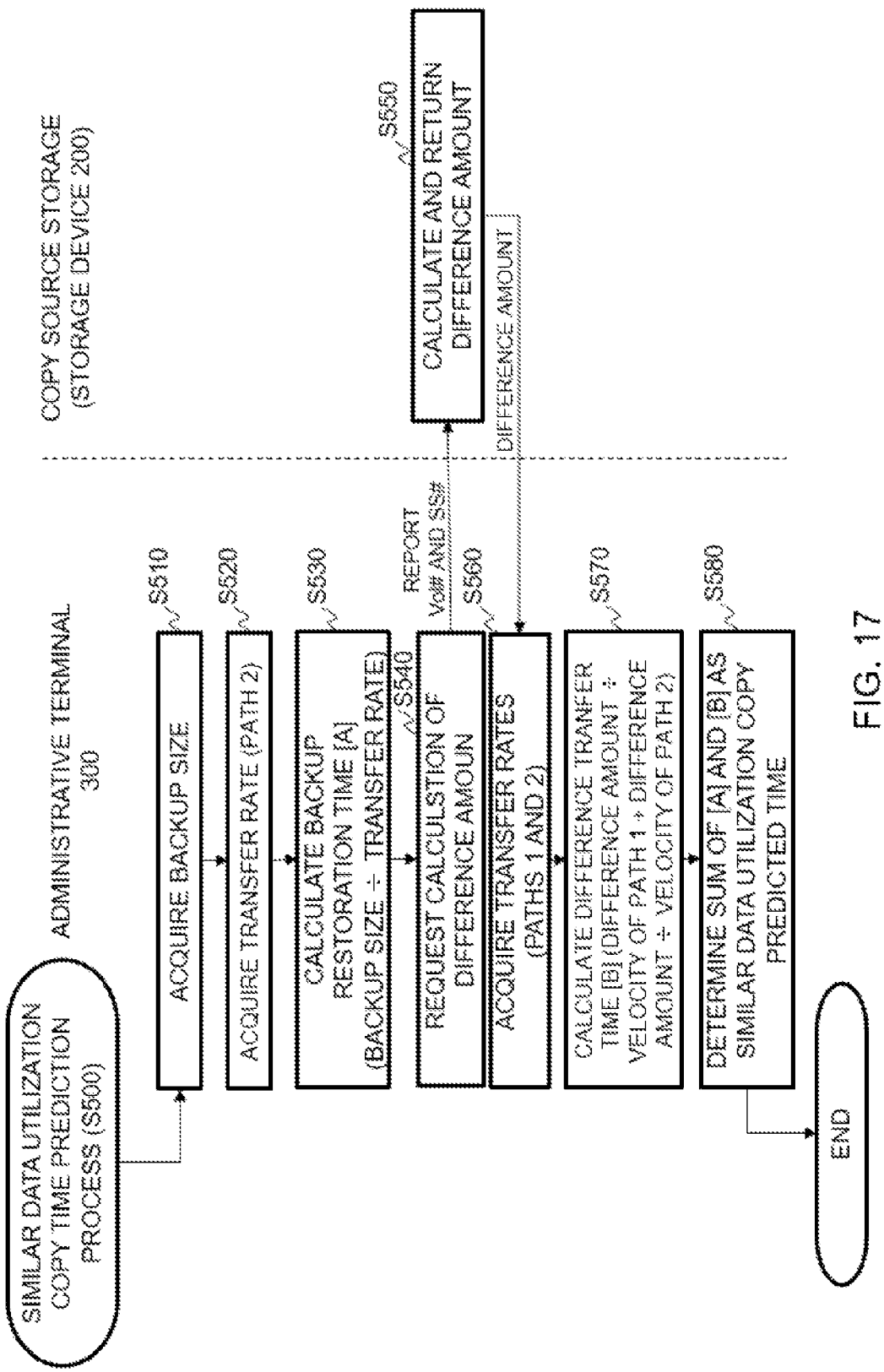
FIG. 17 is a flowchart of a similar data utilization copy, time prediction process according to the first embodiment.

FIG. 17 is a flowchart of the similar data utilization copy time prediction process according to the first embodiment.

The optimal copy path determination program 3113 references the catalog information 264 acquired from the object storage service 400, to obtain (in step S510) the size of the similar data (backup size).

The optimal copy path determination program 3113 then references the transfer path information TBL 3122 to obtain (in step S520) the transfer rate of the path (path 2 in this example) from the storage that holds the similar data object storage service 400 in this example) to the copy destination storage (storage device 500). The optimal copy path determination program 3113 calculates a backup restoration time [A] by dividing the backup size by the transfer rate (in step S530).

The optimal copy path determination program 3113 then requests the copy source storage to calculate an amount of difference between the copy target volume and the similar data (in step S540). Here, the calculation request includes the Vol # and SS # of the copy target volume, for example.

The difference data extraction program 2235 of the copy source storage (storage device 200) calculates the amount of difference between the copy target volume and the similar data, and returns the calculated amount of difference to the optimal copy path determination program 3113 of the administrative terminal 300 (in step S550).

The optimal copy path determination program 3113 acquires the amount of difference returned from the copy source storage, and references the transfer path information TBL 3122 to acquire the transfer rate of the path (path 1) from the copy source storage to the object storage service 400, as well as the transfer rate of the path (path 2) from the object storage service 400 to the copy destination storage (in step S560).

The optimal copy, path determination program 3113 then calculates (in step S570) the time (difference transfer time [B]) required to transfer the difference data. Specifically, the optimal copy path determination program 3113 calculates the difference transfer time by adding up the value obtained by dividing the amount of difference by the transfer rate of the path 1 and the value acquired by dividing the amount of difference by the transfer rate of the path 2.

The optimal copy path determination program 3113 then determines the sum of the backup restoration time [A] and difference transfer time [B] as the similar data utilization copy predicted time (in step S580), and terminates the process.

The similar data utilization copy process (S700) is explained below.

Figure 18:
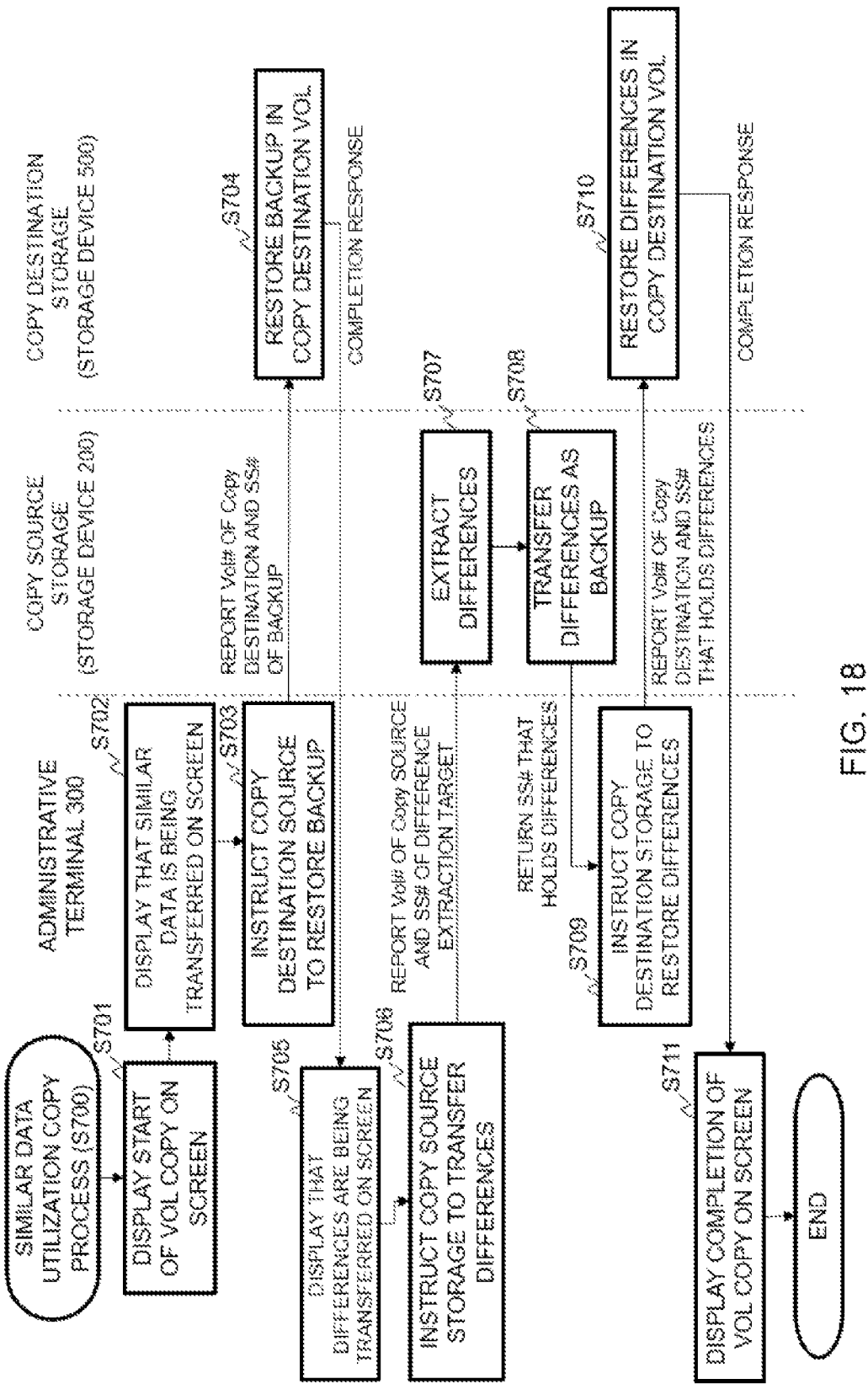
FIG. 18 is a flowchart of a similar data utilization copy process according to the first embodiment.

FIG. 18 is a flowchart of the similar data utilization copy process according to the first embodiment.

The volume copy control program 3111 of the administrative terminal 300 gives a VOL copy start indication on the screen (in step S701). The volume copy control program 3111 thus displays, on the screen, that the similar data is being transferred (in step S702).

The volume copy control program 3111 then transmits pan instruction to restore backup to the copy destination storage (in step S703). The volume copy control program 3111 causes the backup restoration instruction to include the VOL # of the copy destination and the backup ID (SS #) of the backup target data (similar data).

Upon receipt of the backup restoration instruction, the volume copy program 2237 of the copy destination storage restores the data having the backup ID included in the instruction, into the volume having the VOL # at the copy destination (in step S704). The volume copy program 2237 then returns a completion response.

Upon receipt of the completion response to the backup restoration instruction, the volume copy control pro ram 3111 of the administrative terminal 300 displays, on the screen, that the differences are being transferred (in step S705), and transmits an instruction to transfer the differences to the copy source storage (in step S706). The volume copy control program 3111 causes the difference transfer instruction to include the VOL # of the copy source and the backup ID (SS #) of the data targeted for difference extraction.

Upon receipt of the difference transfer instruction, the difference data extraction program 2235 of the copy source storage extracts (in step S707) the differences between the volume having the VOL # of the copy source and the data having backup ID as included in the difference transfer instruction, transfers the difference data thus extracted as a backup to the object storage service 400, and returns the backup ID (551) of the data that holds the differences to the volume copy control program 3111 of the administrative terminal 300 (in step S708).

The volume copy control program 3111 of the administrative terminal 300 transmits, the copy destination to an instruction to restore the difference data (in step S709). The volume copy control program 3111 causes the difference restoration instruction to include the VOL # of the copy destination and the backup ID ((SS #) of the difference data.

Upon receipt of the difference restoration instruction, the volume restoration program 2233 of the copy destination storage restores the difference data having the backup ID included in the difference restoration instruction, into the volume having the VOL # at the copy destination, thereby generating the data of the copy target volume in the copy destination volume (in step S710). The volume restoration program 2233 then returns a completion response. This completes copying of the volume to the copy destination storage.

Upon receipt of the completion response to the difference restoration instruction, the volume copy control program 3111 of the administrative terminal 300 displays, on the screen, that the VOL copy is completed (in step S711), and terminates the similar data utilization cony process.

In the above-described computer system 1 according to the first embodiment, in a case where generation (copy) of data by use of similar data is determined to be faster than straight-forward copying of the copy target data, the data generation may be carried out quickly using the similar data.

A computer system 1A according to a second embodiment of the present invention is explained below. In the ensuing description of the computer system 1A, the constituent elements that are substantially similar to those in the computer system 1 according to the first embodiment are represented by the same reference characters.

Figure 19:
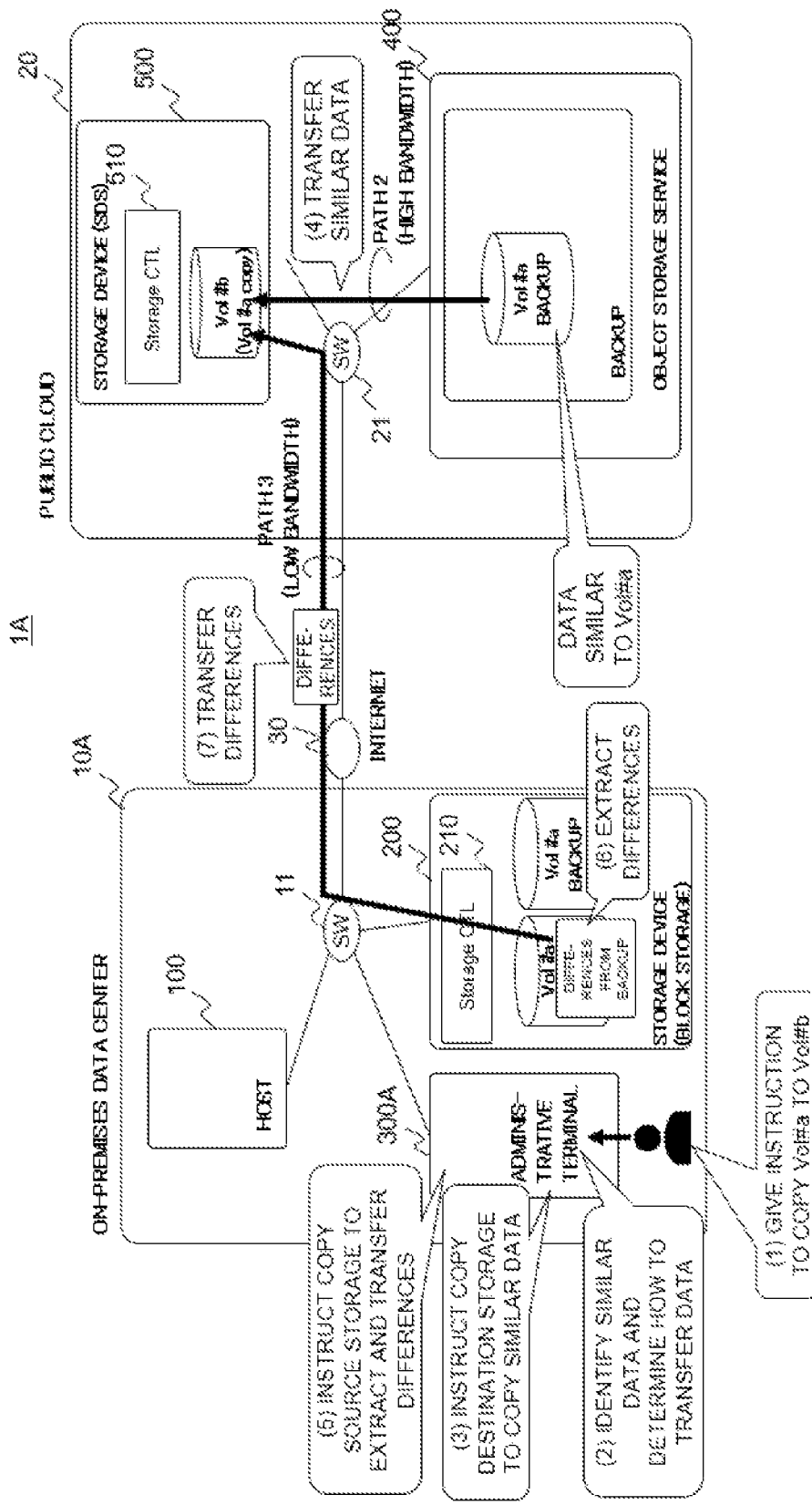
FIG. 19 is a schematic explanatory diagram outlining a data copy process performed by a computer system as a second embodiment of the present invention.

FIG. 19 is a schematic explanatory diagram outlining a data copy process performed by the computer system according to the second embodiment of the present invention.

The data copy process in FIG. 19 involves copying the data of a volume (Vol) #a in the storage device 200 of an on-premises data center 10A to a volume (Vol) #b in the storage device 500 of the public cloud 20. For the second embodiment, it is assumed that the backup data of the Vol #a at a given point in the past is stored in the storage device 200 of the on-premises data center IDA and in the object storage service 400 of the public cloud 20.

The computer system 1A includes an administrative terminal 300A. The administrative terminal 300A differs from the administrative terminal 300 of the first embodiment in terms of 8o me processes performed by the volume copy control program 3111 and by the optimal copy path determination program 3113. Specifically, in execution of the volume copy process, the similar data utilization copy time prediction process (S500) is replaced by a similar data utilization copy time prediction process (S800), and the similar data utilization copy process (3700) is replaced by a similar data utilization copy process (3900).

The administrative terminal 300A receives ((1) in FIG. 19), from the administrator, an instruction to copy the data of the Vol #a in the storage device 200 (copy source storage) to the Vol #b in the storage device 500 (copy destination storage). Given the instruction, the administrative terminal 300A searches for data similar to the copy target data (i.e., similar data is searched for), and determines how to transfer the data ((2) in FIG. 19). It is assumed here that the similar data exists in the object storage service 400 and that it is determined that data copy is to be performed by transmitting the similar data from the object storage service 400 to the storage device 500. Subsequent processes are explained hereunder on the basis of this assumption.

The administrative terminal 300A instructs the copy destination storage (storage device 500 in the example of FIG. 19) to copy the searched-for similar data ((3) in FIG. 19). According to the instruction, the storage device 500 retrieves (reads) the designated similar a data (backup data of the Vol #a) from the object storage service 400 and stores the retrieved data into the Vol #b ((4) in FIG. 19).

The administrative terminal 300A then instructs the copy source storage (storage device 200 in the example of FIG. 19) to extract the differences between the target data and the similar data and to transfer the differences to the copy destination storage ((5) in FIG. 19). According to the instruction, the copy source storage (storage device 200) extracts the difference data by comparing the Vol #a with its backup data ((6) in FIG. 19), and transfers the extracted difference data to the copy destination storage ((7) in FIG. 19).

In turn, the copy destination storage causes the difference data to be reflected in the backup data of the Vol #a, to generate a copy of the Vol #a. This completes copying of the data of the Vol #a to the Vol #b in the storage device 500.

The similar data utilization copy time prediction process (S800) according to the second embodiment is explained below.

Figure 20:
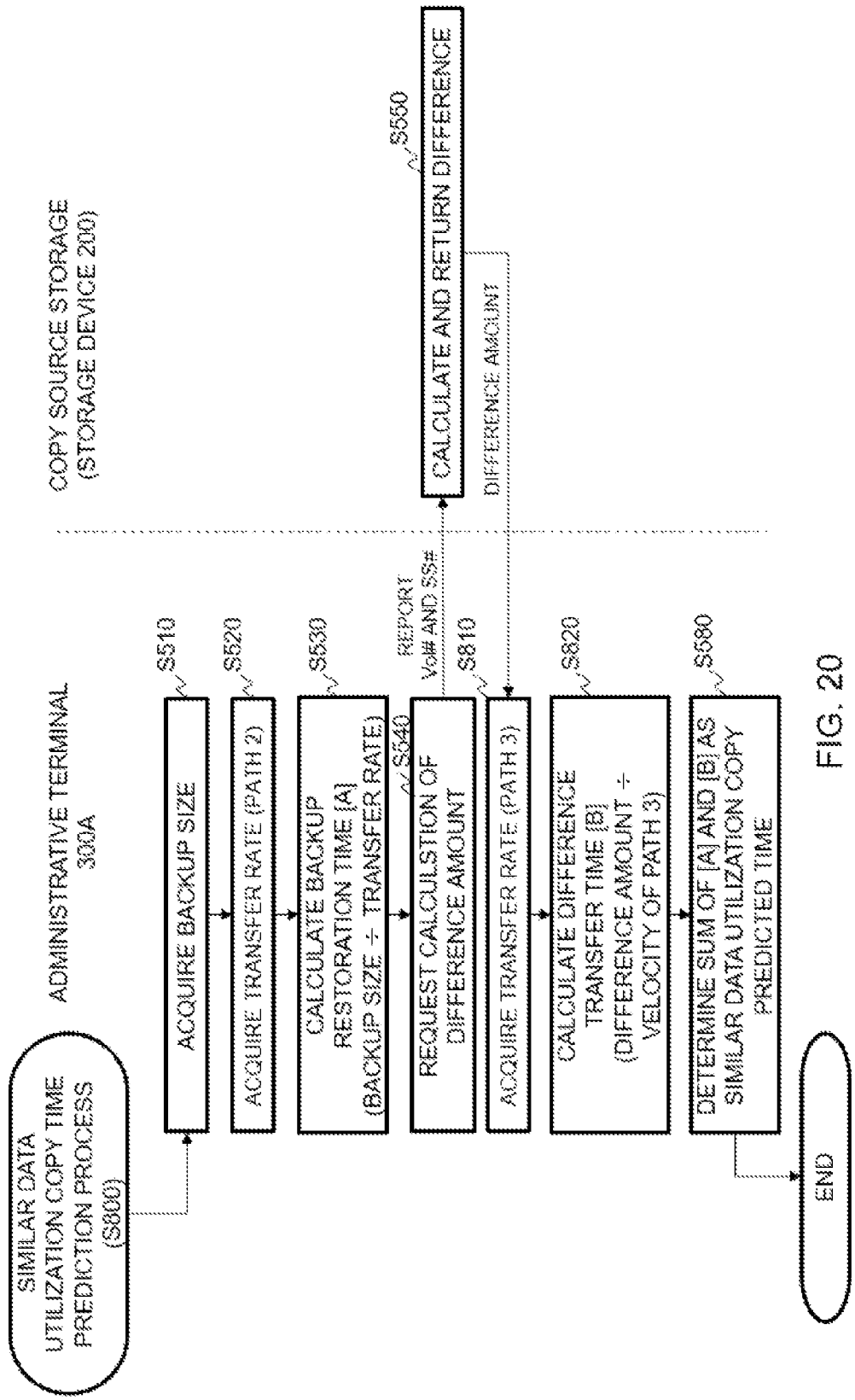
FIG. 20 is a flowchart of a similar data utilization copy time prediction process according to the second embodiment.

FIG. 20 is a flowchart of the similar data utilization copy time prediction process according to the second embodiment. The steps in this process that are similar to those in the similar data utilization copy time prediction process according to the first embodiment in FIG. 17 are designated by the same reference characters, with duplicate descriptions omitted where appropriate.

The optimal copy path determination program 3113 acquires the amount of difference returned from the copy source storage, and references the transfer path information TBL 3122 to acquire the transfer rate of the path (path 3) from the copy source storage to the copy destination storage (in step S810).

The optimal copy path determination program 3113 then calculates (in step S820) the time (difference transfer time [B]) required to transfer the difference data. Specifically, the optimal copy path determination program 3113 calculates the difference transfer time by dividing the amount of difference by the transfer rate of the path 3.

The optimal copy path determination program 3113 then determines the sum of the backup restoration time [A] and difference transfer time [B] as the similar data utilization copy predicted time (in step S580), and terminates the process.

According to this similar data utilization copy time prediction process, it is possible suitably to predict the td me of the similar data utilization copy process in which the similar data is transferred from the object storage service 400 to the copy destination storage and in which the difference data is transferred from the copy source storage to the copy destination storage.

The similar data utilization copy process (S900) according to the second embodiment is explained below.

Figure 21:
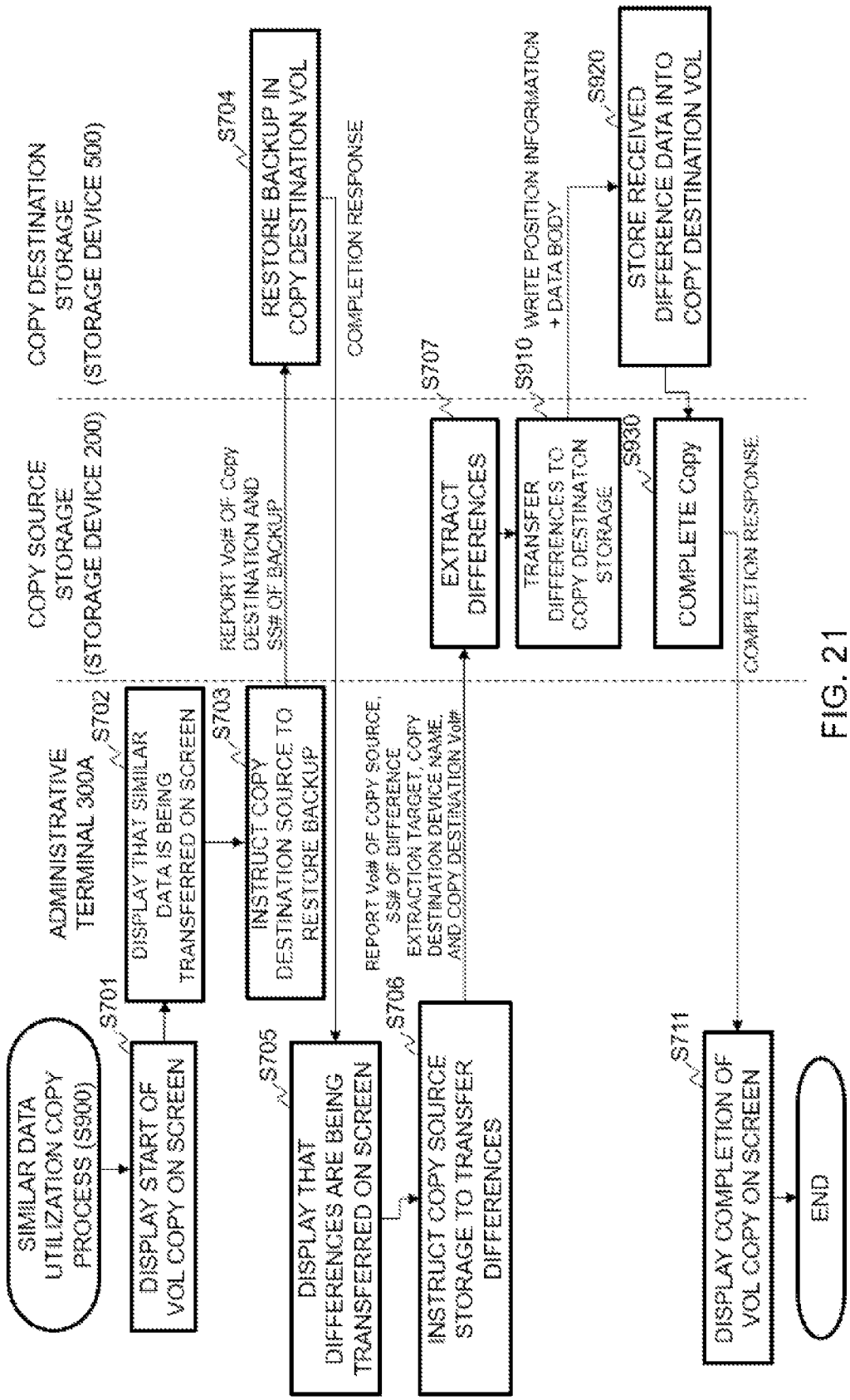
FIG. 21 is a flowchart of a similar data utilization copy process according to the second embodiment.

FIG. 21 is a flowchart of the similar data utilization copy process according to the second embodiment. The steps in this process that are similar to those in the similar data utilization copy time prediction process according to the second embodiment in FIG. 18 are designated by the same reference characters, with duplicate descriptions omitted where appropriate.

Upon receipt of the difference transfer instruction, the difference data extraction program 2235 of the copy source storage extracts (inn step S707) the differences between the volume having the VOL # of the copy source and the data having the backup ID as included in the difference transfer instruction. The difference data extraction program 2235 then transfers (in step S910), to the copy destination storage, the extracted difference data and information indicative of a write position of the difference data in the volume (i.e., write position information).

Upon receipt of the difference data, the volume restoration program 2233 of the copy destination storage generates the copy target volume by storing the difference data into the copy destination volume according to the write position information (in step S920). The volume restoration program 2233 then returns completion response. This completes copying of the volume to the copy destination storage.

Upon receipt of the storage completion response from the copy destination storage, the volume copy program 2237 of the copy source storage sends a VOL copy completion response to the administrative terminal 300A (in step S930).

A computer system 1B according to a third embodiment of the present invention is explained below. In the ensuing description of the computer system 1B, the constituent elements that are substantially similar to those in the computer system 1 according to the first embodiment are represented by the same reference characters.

Figure 22:
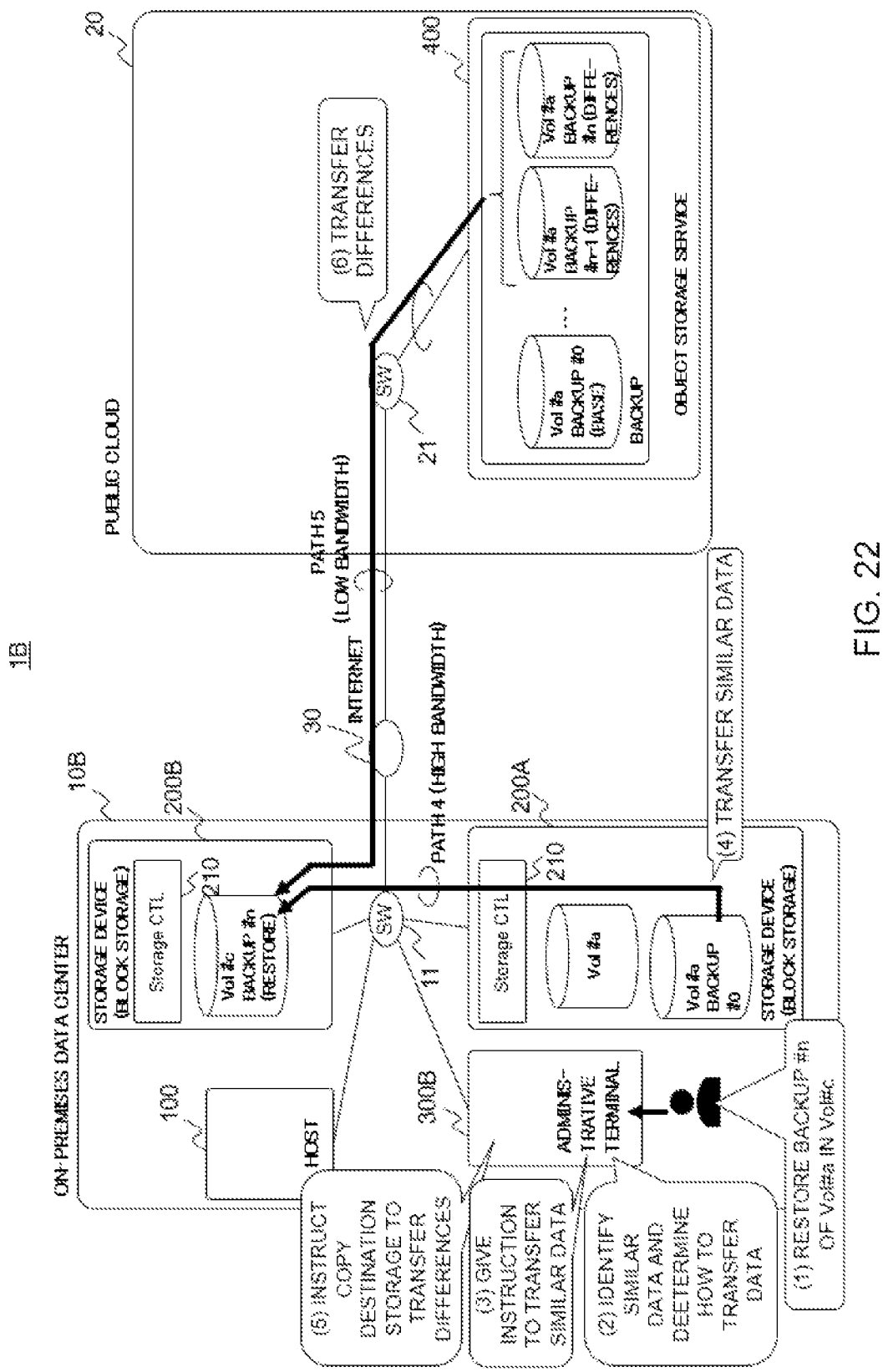
FIG. 22 is a schematic explanatory diagram outlining a data copy process performed by a computer system according to a third embodiment of the present invention.

FIG. 22 is a schematic explanatory diagram outlining a data copy process performed by the computer system according to the third embodiment of the present invention.

The data copy process in FIG. 22 involves copying (restoring) a volume (Vol #a) at a given point in time in a storage device 200B of on-premises data center 10B to a storage device 200B of an on-premises data center 10B. In the third embodiment, the backup data including an entire backup of the Vol #a at a given point in the past (as a backup (base)) is stored in the storage device 200A of the on-premises data center 10B. The same backup data as that in the storage device 200A is stored in the object storage service 400 of the public cloud 20. The object storage service 400 of the public cloud 20 further retains the difference data (backup (differences)) preceding the given point in time of the Vol #a. In the third embodiment, the backup data of the base is regarded as the backup #0 (base), and the difference data at a later n-th backup point in time is regarded as the backup #n (differences).

The computer system 1B includes an administrative terminal 300B. The administrative terminal 300B differs from the administrative terminal 300 of the first embodiment in terms of some processes.

The administrative terminal 300B receives ((1) in FIG. 22), from the administrator, an instruction to copy (prepare) the data of the Vol #a at a given backup point in time (time point n in this case) in the storage device 200A to a Vol #c in the storage device 200B (copy destination storage). In the third embodiment, the copy instruction includes, for example, the Vol # of the restoration target, information indicative of the backup point in time of the restoration target (backup #), and the Vol # of the copy destination.

The administrative terminal 300B searches for data similar to the data of the restoration target at the backup point in time (i.e., similar data is searched for), and determines how to transfer the data ((2) in FIG. 22). Here, the storage device 200A retains the backup #0 of the Vol #a, i.e., base backup data preceding the backup point n in time of the restoration target, so that the base backup data is searched for as the similar data. Thus, the assumption is that the data copy is determined to be performed transferring the similar data from the storage device 200A to the storage device 200B. Subsequent processes are explained hereunder on the basis of this assumption.

The administrative terminal 300B instructs the storage device 200A to transfer the searched-for similar data ((3) in FIG. 22). According to the instruction, the storage device 200A retrieves (reads) the designated similar data (backup #0 of the Vol. #a), and stores ((4) in FIG. 22) the retrieved data into the Vol #c in the copy destination storage (storage device 200B).

The administrative terminal 300B then instructs the copy destination storage (storage device 200B) to transfer the differences between the restoration target data and the similar data ((5) in FIG. 22). According to the instruction, the copy destination storage (storage device 200B) transfers, from the object storage service 400, the difference data up to the backup point in time of the restoration target subsequent to the similar data ((6) in FIG. 22). For example, in a case where the backup point in time is #n, the copy destination storage (storage device 200B) transfers, from the object storage service 400, the backup data ranging from the backup #1 to the backup #n. Here, the data ranging from the backup #0 to the backup #n constitutes the basic data corresponding to the copy target data.

The copy destination storage then generates the data at the Predetermined backup point n in time of the Vol #a by causing the backup data ranging from the backup 41 to the backup #n to be successively reflected in the backup #0 of the Vol #a stored in the Vol #c. This completes generation (copy) of the data at the predetermined backup point n in time in the storage device 200B.

The present invention is not limited to the preferred embodiments discussed above and may be implemented in diverse variations so far as they are within the scope of this invention.

For example, in the above-described embodiments, the predicted time of the normal copy is compared with the predicted time of the similar data utilization copy such that the data may be copied using the type of copy subject to the shorter predicted time. However, this is not limitative of the present invention. As depicted in FIG. 1, for example, there may be a case, where the communication rate between the copy source storage and the copy destination storage is low and where the communication rate of the path between the storage that holds the similar data (object storage service 400 in FIG. 1) on one hand and the copy destination storage on the other hand is high, and thus, the processing time is expected to be shorter if the similar data utilization copy is used instead of the normal copy. In that case, the similar data utilization copy may be performed preferentially without predicting and comparing the expected times of the different copy types.

Some or all of the processes performed by the processors in the above-described embodiments may be carried out by use of hardware circuits. The programs used by the above embodiments may be installed from program sources. The program sources may be program distribution servers or storage media (e.g., portable storage media).

What is claimed is:

1. A data generation control system comprising:
a plurality of storage devices and an administrative device, wherein the administrative device
receives designation of generation target data and of a generation destination storage device constituting a storage device in which the generation target data is generated,
identifies data similar to the generation target data,
calculates a first predicted time expected to be required for a first transmission process of transmitting basic data from a generation source storage device holding the basic data corresponding to the generation target data to the generation destination storage device, and a second predicted time expected to be required for a second transmission process of transmitting the similar data from a similar data storage device holding the similar data to the generation destination storage device and of transmitting difference data between the basic data and the similar data from the generation source storage device to the generation destination storage device, and
performs, if the second predicted time is shorter than the first predicted time, the second transmission process to transmit the similar data and the difference data to the generation destination storage device so as to generate the generation target data in the generation destination storage device, and performs, if the second predicted time is not shorter than the first predicted time, the first transmission process to transmit the basic data to the generation destination storage device so as to generate the generation target data in the generation destination storage device.

2. The data generation control system according to claim 1, wherein
the plurality of storage devices include a backup execution storage device that stores backup data at a given point in time of data administered by the storage devices, into a backup storage device as a storage device for backup use, and
the administrative device identifies, as the similar data, the backup data for the generation target data in the backup storage device.

3. The data generation control system according to claim 2, wherein
the backup execution storage device also stores therein the backup data to be stored into the backup storage device, and
the generation source storage device identifies the difference data on a basis of the basic data and the backup data if the generation source storage device is the backup execution storage device.

4. The data generation control system according to claim 3, wherein
the administrative device in the second transmission process,
causes the generation source storage device to transmit the difference data to the backup storage device, and
causes the generation destination storage device to acquire the difference data from the backup storage device.

5. The data generation control system according to claim 3, wherein
the administrative device in the second transmission process,
causes the generation source storage device to transmit the difference data to the generation destination storage device.

6. The data generation control system according to claim 1, wherein
the generation source storage device
determines whether or not the difference data is able to be extracted, and transmits a result of the determination to the administrative device, and
the administrative device
performs the first transmission process upon receipt of the result of the determination indicating that the difference data is not able to be extracted from the generation source storage device, and
determines which of the first transmission process and the second transmission process is to be executed, upon receipt of the result of the determination indicating that the difference data is able to be extracted from the generation source storage device.

7. The data generation control system according to claim 1, wherein
the generation source storage device
calculates an amount of the difference data and transmits the calculated data amount to the administrative device, and
the administrative device
calculates the second predicted time on a basis of an amount of the similar data and the amount of the difference data.

8. A data generation control system comprising:
a plurality of storage devices and an administrative device, wherein a communication rate of a path between a first storage device and a second storage device is lower than a communication rate of a path between a third storage device and the second storage device, and the administrative device
- determines whether or not data similar to the generation target data exists in the third storage device, upon receipt of an instruction to generate, in the second storage device, predetermined generation target data stored in the first storage device,
- causes the similar data to be transmitted to the second storage device if the similar data exists in the third storage device,
- causes difference data between the target data and the similar data to be transmitted to the second storage device, and
- causes the generation target data to be generated in the second storage device on a basis of the similar data and the difference data.

9. A data generation control method for use with a data generation control system including a plurality of storage devices and an administrative device, the method comprising by the administrative device:

receiving designation of generation target data and of a generation destination storage device constituting a storage device in which the generation target data is generated;

identifying data similar to the generation target data;

calculating a first predicted time expected to be required for a first transmission process of transmitting basic data from a generation source storage device holding the basic data corresponding to the generation target data to the generation destination storage device, and a second predicted time expected to be required for a second transmission process of transmitting the similar data from a similar data storage device holding the similar data to the generation destination storage device and of transmitting difference data between the basic data and the similar data from the generation source storage device to the generation destination storage device; and performing, if the second predicted time is shorter than the first predicted time, the second transmission process to transmit the similar data and the difference data to the generation destination storage device so as to generate the generation target data in the generation destination storage device, and performing, if the second predicted time is not shorter than the first predicted time, the first transmission process to transmit the basic data to the generation destination storage device so as to generate the generation target data in the generation destination storage device.

* * * * *